United States Patent
Kim et al.

(10) Patent No.: US 11,557,828 B2
(45) Date of Patent: *Jan. 17, 2023

(54) ELECTRONIC DEVICE INCLUDING ANTENNAS

(71) Applicant: LG ELECTRONICS INC., Seoul (KR)

(72) Inventors: Dongjin Kim, Seoul (KR); Youngbae Kwon, Seoul (KR); Byungwoon Jung, Seoul (KR); Jihun Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,395

(22) Filed: Oct. 29, 2021

(65) Prior Publication Data
US 2022/0052439 A1  Feb. 17, 2022

Related U.S. Application Data

(63) Continuation of application No. 16/931,359, filed on Jul. 16, 2020, now Pat. No. 11,196,147.

(30) Foreign Application Priority Data

Mar. 19, 2020  (WO) ................ PCT/KR2020/003758

(51) Int. Cl.
*H01Q 1/24* (2006.01)
*H04B 1/38* (2015.01)
(Continued)

(52) U.S. Cl.
CPC ............. *H01Q 1/243* (2013.01); *H01Q 5/307* (2015.01); *H04B 1/38* (2013.01); *H04B 7/0413* (2013.01); *H04W 88/06* (2013.01)

(58) Field of Classification Search
CPC .......... H04B 1/38; H04B 1/3827; H04B 1/40; H04B 1/401; H04B 1/44; H04B 7/0404;
(Continued)

(56) References Cited

U.S. PATENT DOCUMENTS

| 10,224,606 B2 | 3/2019 | Kim et al. |
| 10,355,758 B2 | 7/2019 | Wang et al. |

(Continued)

FOREIGN PATENT DOCUMENTS

| CN | 110299614 | 10/2019 |
| JP | 2009501493 | 1/2009 |

(Continued)

OTHER PUBLICATIONS

United States Patent and Trademark Office U.S. Appl. No. 16/931,359, Office Action dated May 7, 2021, 14 pages.

(Continued)

*Primary Examiner* — Quochien B Vuong
(74) *Attorney, Agent, or Firm* — Lee, Hong, Degerman, Kang & Waimey PC

(57) ABSTRACT

An electronic device having antennas according to an implementation is provided. The electronic device may include a first antenna disposed on a rim thereof and configured to receive a first signal that is a Long-Term Evolution (LTE) signal or a New Radio (NR) signal of a first band, a second antenna disposed to be spaced apart from the first antenna by a predetermined interval, and configured to receive a second signal that is an LTE or NR signal of a second band higher than the first band, and a transceiver circuit operably coupled to the first antenna and the second antenna. In one implementation, the electronic device may include a baseband processor configured to control the transceiver circuit to receive the first signal through the first antenna and the second signal through the second antenna.

23 Claims, 25 Drawing Sheets

(51) Int. Cl.
   *H04B 7/04* (2017.01)
   *H04W 88/06* (2009.01)
   *H04B 7/0413* (2017.01)
   *H01Q 5/307* (2015.01)
(58) Field of Classification Search
   CPC ...... H04B 7/0413; H04B 10/50; H01Q 1/241; H01Q 1/243; H01Q 21/08; H01Q 21/28; H01Q 5/307
   See application file for complete search history.

(56) References Cited

U.S. PATENT DOCUMENTS

| | | |
|---|---|---|
| 10,498,029 B1 | 12/2019 | Tran et al. |
| 10,560,139 B2* | 2/2020 | Brunel ................. H04B 1/0064 |
| 10,587,329 B2* | 3/2020 | Maldonado ............. H04B 1/44 |
| 10,720,705 B2 | 7/2020 | Zhao et al. |
| 10,721,772 B2 | 7/2020 | Xiong et al. |
| 11,108,168 B2* | 8/2021 | Rofougaran ........... H01Q 21/28 |
| 2013/0342425 A1 | 12/2013 | Wong et al. |
| 2019/0058263 A1 | 2/2019 | Oh et al. |
| 2020/0323032 A1* | 10/2020 | Kim ...................... H04W 76/30 |
| 2021/0296758 A1 | 9/2021 | Kim et al. |

FOREIGN PATENT DOCUMENTS

| | | |
|---|---|---|
| KR | 20170040512 | 4/2017 |
| KR | 102013588 | 8/2019 |

OTHER PUBLICATIONS

PCT International Application No. PCT/KR2020/003758, International Search Report dated Dec. 11, 2020, 12 pages.

* cited by examiner

FIG. 5B

| SUBCARRIER SPACING: $f_0 \times 2^\mu$, $f_0 = 15kMz$ AND SCALING VALUE $2^\mu, \in \{-2, 0, 1, 2,..., 5\}$ | | | | | | | |
|---|---|---|---|---|---|---|---|
| m | -2 | 0 | 1 | 2 | 3 | 4 | 5 |
| SUBCARRIER SPACING[kHz] | 3.75 | 15 | 30 | 60 | 120 | 240 | 480 |
| LENGTH OF OFDM SYMBOL [ms] | 266.67 | 66.67 | 33.33 | 16.67 | 8.333 | 4.17 | 2.08 |

15kHz 1 SLOT(14 SYMBOLS)   1ms SUBFRAME

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 |   30kHz 1 SLOT(14 SYMBOLS)   0.5ms

| 0 | 1 |   15kHz 1 SLOT(2 SYMBOLS) : 0.2ms

| 0 | 1 | 2 | 3 |   30kHz MINI SLOT(4 SYMBOLS) : 0.2ms

| 0 | 1 | 2 | 3 | 4 | 5 | 6 |   60kHz MINI SLOT(7 SYMBOLS)   0.125ms

FIG. 7B

|  | ANT No. | ANT 1<br>LB | ANT 2<br>M/HB | ANT 1<br>LB | ANT 3<br>M/HB |
|---|---|---|---|---|---|
| Stand Alone | LB LTE ST | FEM1<br>LB LTE |  |  |  |
|  | LB NR ST |  |  | FEM2<br>LB NR |  |
|  | M/HB LTE ST |  | FEM1<br>M/HB LTE |  | FEM2<br>M/HB LTE |
|  | M/HB NR ST |  | FEM1<br>M/HB NR |  | FEM2<br>M/HB NR |
| ENDC | M/HB NR ST | FEM1<br>LB LTE |  |  | FEM2<br>M/HB NR |
|  | M/HB NR ST |  | FEM1<br>M/HB LTE | FEM2<br>LB NR |  |
|  | M/HB NR ST |  | FEM1<br>M/HB LTE |  | FEM2<br>M/HB NR |

*FIG. 12*

| | Band | Tx. | Rx. |
|---|---|---|---|
| LB | B5/N5 | 824~849 | 869~894 |
| MB | B66/N66 | 1710~1780 | 2110~2200 |
| | B2/N2 | 1850~1910 | 1930~1990 |
| HB | B41/N41 | 2496~2690 ||
| UHB | N78 | 3300~3800 ||

ELECTRONIC DEVICE INCLUDING ANTENNAS

CROSS-REFERENCE TO RELATED APPLICATIONS

This application is a continuation of U.S. patent application Ser. No. 16/931,359, filed on Jul. 16, 2020, which claims the benefit of earlier filing date and right of priority to International Application No. PCT/KR2020/003758, filed on Mar. 19, 2020, the contents of which are all hereby incorporated by reference herein in its entirety.

BACKGROUND

1. Technical Field

The present disclosure relates to an electronic device having antennas. One particular implementation relates to an electronic device having a plurality of antennas operating in different communication systems.

2. Description of the Related Art

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the electronic device may be configured to provide 5G communication services in various frequency bands. Recently, attempts have been made to provide 5G communication services using a sub-6 band below a 6 GHz band. In the future, it is also expected to provide 5G communication services by using a millimeter wave (mm-Wave) band in addition to the sub-6 band for faster data rate.

Meanwhile, 5G NR signals of a sub-6 band and 4G LTE signals may be transmitted and received through different antennas, respectively. In this regard, when antennas for transmitting and receiving the 5G NR signals of the sub-6 band and antennas for transmitting and receiving the 4G LTE signals are provided separately, a space for arranging those antennas is insufficient in the electronic device.

SUMMARY

One aspect of the present disclosure is to solve the aforementioned problems and other drawbacks. Another aspect of the present disclosure is to provide an electronic device having a plurality of antennas operating in different communication systems.

Another aspect of the present disclosure is to configure or maintain a dual connectivity state with different communication systems using a plurality of antennas provided in an electronic device.

Another aspect of the present disclosure is to provide a structure for partially sharing an antenna and a front-end module for transmitting or receiving a 5G NR signal and an antenna and a front-end module for transmitting and receiving a 4G LTE signal.

To achieve the above or other aspects, an electronic device having antennas according to one implementation is provided. The electronic device may include a first antenna disposed on a rim thereof and configured to receive a first signal that is a Long-Term Evolution (LTE) signal or a New Radio (NR) signal of a first band, a second antenna arranged to be spaced apart from the first antenna by a predetermined interval, and configured to receive a second signal that is an LTE or NR signal of a second band higher than the first band, and a transceiver circuit operably coupled to the first antenna and the second antenna.

In one implementation, the electronic device may a baseband processor configured to control the transceiver circuit to receive the first signal through the first antenna and the second signal through the second antenna.

In one implementation, the baseband processor may perform carrier aggregation (CA) or maintain a dual connectivity state with a Fourth-Generation (4G) communication system and a Fifth-Generation (5G) communication system by receiving the first signal through the first antenna and the second signal through the second antenna.

In one implementation, the electronic device may further include a third antenna arranged to be spaced apart from the first antenna by a predetermined interval, and configured to receive a third signal that is the LTE signal or the NR signal of the second band. The baseband processor may perform Multi input/multi output (MIMO) or maintain a dual connectivity state with a 4G communication system and a 5G communication system by receiving the second signal through the second antenna and the third signal through the third antenna.

In one implementation, the electronic device may further include a fourth antenna arranged to be spaced apart from the third antenna by a predetermined interval, and configured to receive a fourth signal that is the LTE signal or the NR signal of the second band. The baseband processor may perform the MIMO or maintain the dual connectivity state with the 4G communication system and the 5G communication system by receiving signals through at least two antennas of the first to fourth antennas.

In one implementation, the electronic device may further include a fifth antenna arranged to be spaced apart from the fourth antenna by a predetermined interval, and configured to receive a fifth signal that is the LTE signal or the NR signal of the second band. The baseband processor may perform the MIMO or maintain the dual connectivity state with the 4G communication system and the 5G communication system by receiving signals through at least two antennas of the first to fifth antennas.

In one implementation, the first antenna may be configured as a metal rim on a lower region of the electronic device and one side region connected to the lower region, and the second antenna may be configured as a metal rim on the lower region and another side region connected to the lower region.

In one implementation, the third antenna may be configured as a metal rim on the one side region to be spaced apart from the first antenna by a predetermined interval due to a dielectric member, and the fourth antenna may be configured as a metal rim on an upper region of the electronic device and one side region connected to the upper region. The fifth antenna may be configured as a metal rim on the upper region and another side region connected to the upper region.

In one implementation, the electronic device may further include a first transceiver circuit operably coupled to the first antenna and the second antenna and configured to amplify signals of the first band for reception. The electronic device may further include a second transceiver circuit operably coupled to the first antenna and the third antenna and configured to amplify signals of the second band.

In one implementation, the first antenna may be configured to receive and transmit the LTE or NR signal of the first band. The second antenna may be configured to receive and transmit the LTE or NR signal of the second band. The third antenna may be configured to receive the LTE or NR signal of the second band.

In one implementation, the baseband processor may perform Carrier Aggregation (CA) over the first to third bands by receiving a signal through at least one of the first to fifth antennas.

In one implementation, the electronic device may further include a first Radio Frequency (RF) module operably coupled to the fourth antenna and configured to amplify a signal of the first band for reception. The electronic device may further include a second RF module operably coupled to the fourth antenna, configured to amplify signals of the second band and the third band for reception. The electronic device may further include a third RF module operably coupled to the fifth antenna, and configured to amplify signals of the second band and the third band and receive and transmit the amplified signals.

In one implementation, the fourth antenna may be configured to receive the signals of the first to third bands, transfer the signal of the first band to the first RF module and the signals of the second and third bands to the second RF module. The fifth antenna may be configured to receive the signals of the second band and the third band and transmit the received signals of the second band and the third band to the third RF module.

In one implementation, the electronic device may further include a transmission switch operably coupled to the first transceiver circuit and the second transceiver circuit, and configured to switch a path of the LTE or NR signal of the first band. The baseband processor may control a connectivity state of the transmission switch to be changed in a subframe before the NR signal is transmitted after the LTE signal is transmitted.

In one implementation, the second antenna may be configured to receive and transmit the second signal of the second band and the third signal of the third band higher than the second band. The third antenna may be configured to receive and transmit the second signal of the second band and the third signal of the third band.

In one implementation, the baseband processor may control the second RF module and the third RF module to perform MIMO through the fourth antenna and the fifth antenna while performing the CA of the second band and the third band.

An electronic device having antennas according to another implementation of the present invention is provided. The electronic device may include a first antenna disposed on a rim thereof and configured to receive a first signal that is a Long-Term Evolution (LTE) signal or a New Radio (NR) signal of a first band, a second antenna arranged to be spaced apart from the first antenna by a predetermined interval, and configured to receive a second signal that is an LTE or NR signal of a second band higher than the first band, and a transceiver circuit operably coupled to the first antenna and the second antenna, and including an Radio Frequency (RF) chain for amplifying the LTE signal and an RF chain for amplifying the NR signal.

In one implementation, the electronic device may further include a modem configured to control the different RF chains within the transceiver circuit to receive the first signal through the first antenna and the second signal through the second antenna.

According to the present disclosure, an electronic device having a plurality of antennas operating in different communication systems such as 4G LTE and 5G NR can be provided.

According to the present disclosure, a structure for sharing 4G/5G receiving antennas of adjacent bands within an electronic device can be provided.

According to the present disclosure, even when 5G communication is supported, 4G LTE antennas can be shared, which may result in improving the freedom of antenna design in a 5G sub-6 band.

According to the present disclosure, a layout of a plurality of antennas of different communication systems can be designed without changing a form factor of an electronic device, which may result in enabling a dual connectivity operation.

According to the present disclosure, dual connectivity and multi-connectivity with communication systems such as LTE/sub-6/mmWave can be configured and maintained using a plurality of antennas provided in an electronic device.

According to the present disclosure, Carrier Aggregation (CA) and/or MIMO operations can be performed in an EN-DC state using different antennas in an electronic device.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF THE DRAWINGS

FIG. 5B is a view illustrating a change in a slot length in accordance with a change in a subcarrier spacing in the NR.

FIG. 7B is a view illustrating power amplifiers and antennas through which signals are transmitted in various cases of a stand-alone state and an EN-DC state.

FIG. 12 is a view illustrating transmission bands and reception bands of frequency bands in accordance with various embodiments described herein.

DETAILED DESCRIPTION OF THE EMBODIMENTS

Figure 1A:
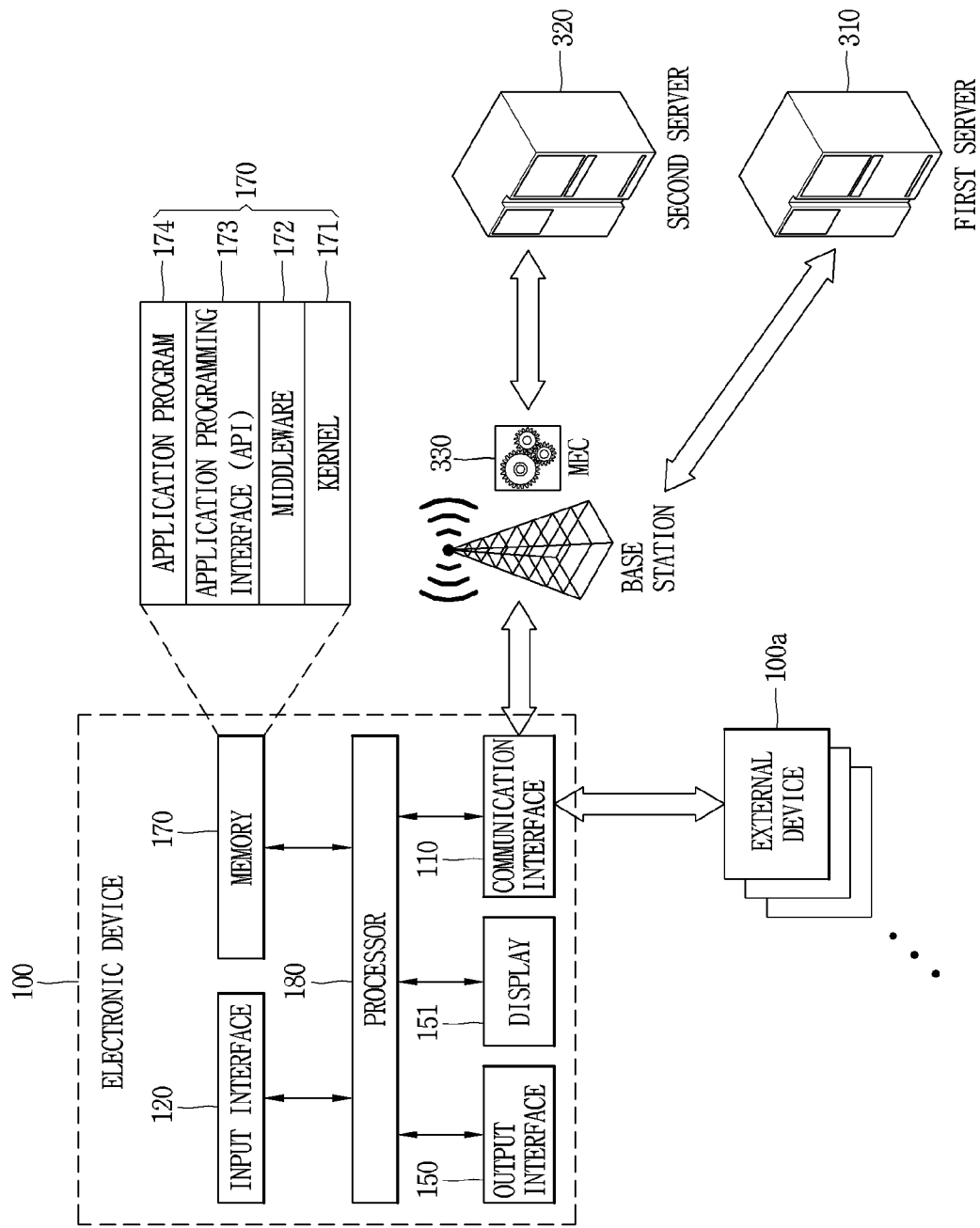
FIG. 1A is a view illustrating a configuration for describing an electronic device in accordance with one embodiment, and an interface between the electronic device and an external device or server.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
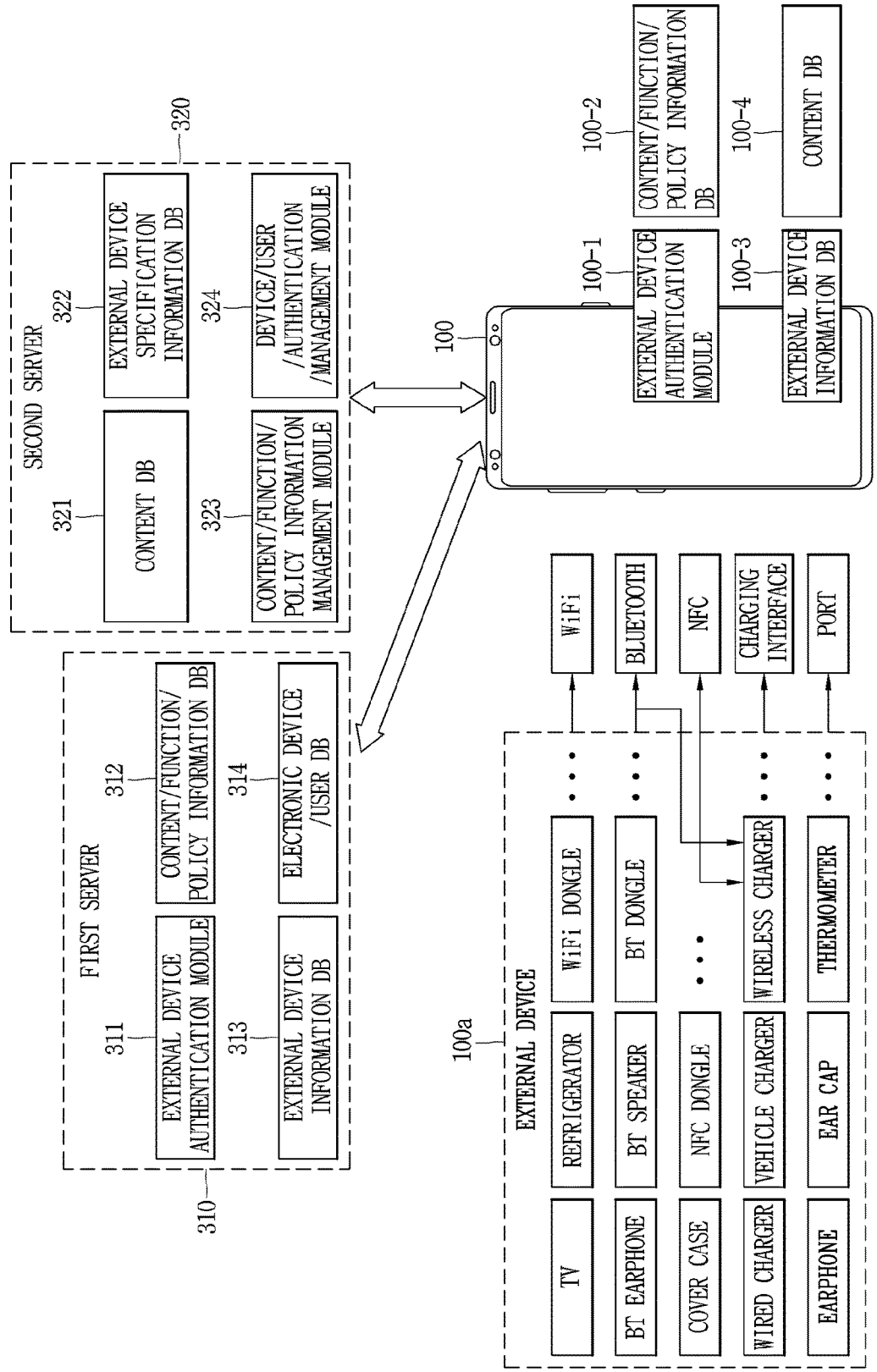
FIG. 1B is a view illustrating a detailed configuration in which the electronic device according to the one embodiment is interfaced with an external device or a server.
Figure 1C:
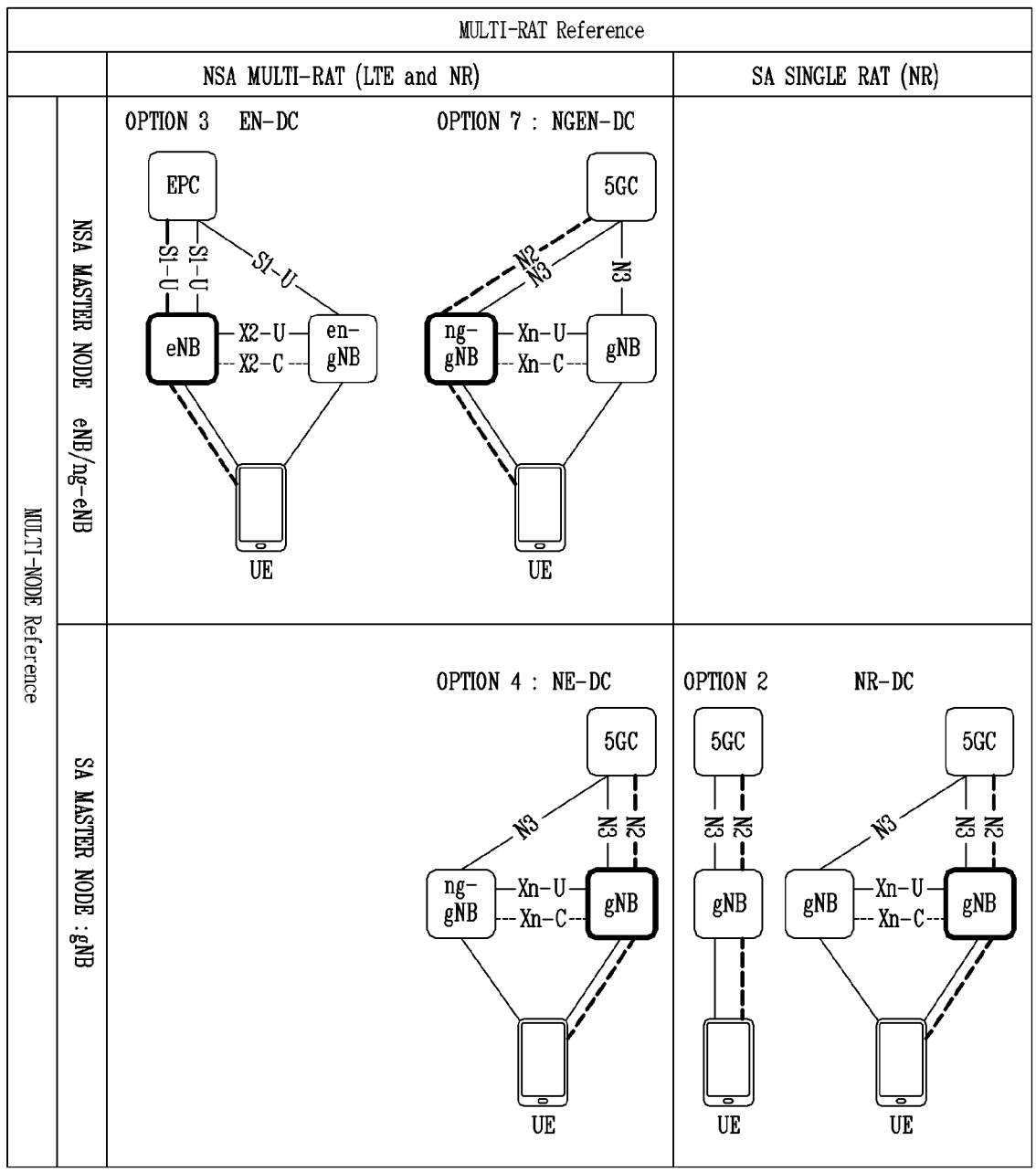
FIG. 1C is a view illustrating a configuration in which the electronic device according to the one embodiment is interfaced with a plurality of base stations or network entities.

Referring to FIGS. 1A to 1C, FIG. 1A is a view illustrating a configuration for describing an electronic device in accordance with one embodiment, and an interface between the electronic device and an external device or server. FIG. 1B is a view illustrating a detailed configuration in which the electronic device according to the one embodiment is interfaced with an external device or a server. FIG. 1C is a view illustrating a configuration in which the electronic device according to the one embodiment is interfaced with a plurality of base stations or network entities.

Figure 2A:
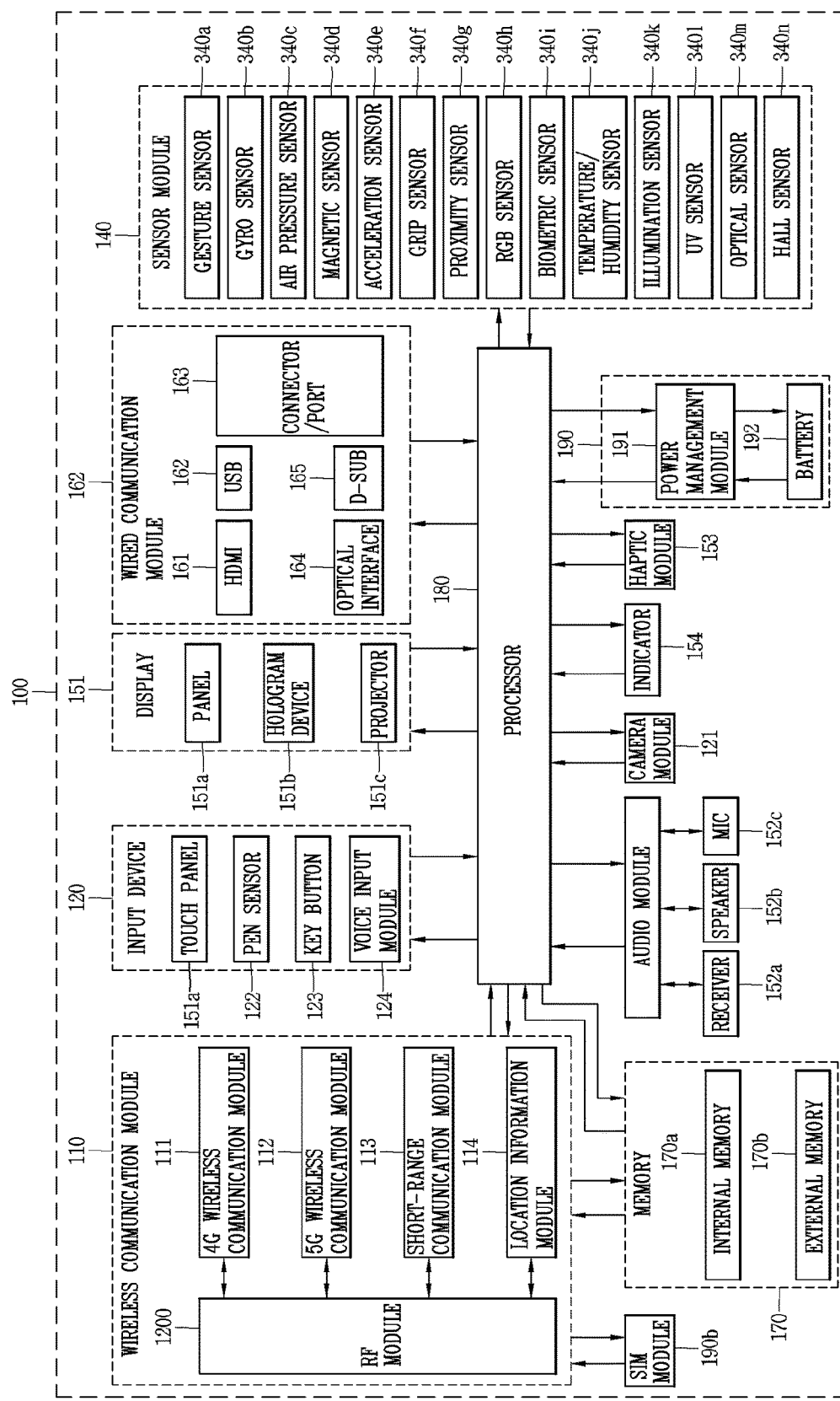
FIG. 2A is a view illustrating a detailed configuration of the electronic device of FIG. 1A.
Figure 2B:
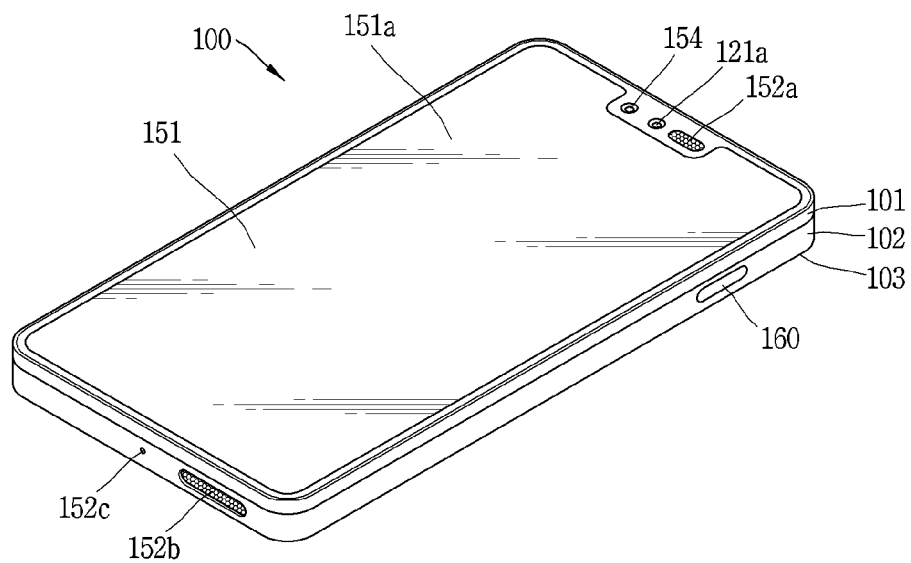
FIGS. 2B and 2C are conceptual views illustrating one example of an electronic device according to the present disclosure, viewed from different directions.
Figure 2C:
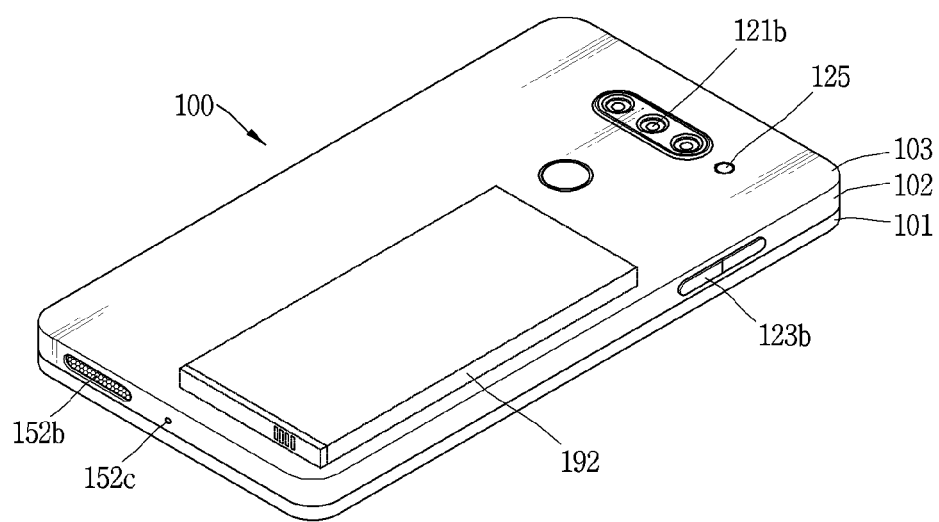

Meanwhile, referring to FIGS. 2A to 2C, FIG. 2A is a view illustrating a detailed configuration of the electronic device of FIG. 1A. FIGS. 2B and 2C are conceptual views illustrating one example of an electronic device according to the present disclosure, viewed from different directions.

Referring to FIG. 1A, the electronic device 100 is configured to include a communication interface 110, an input interface (or input device) 120, an output interface (or output device) 150, and a processor 180. Here, the communication interface 110 may refer to a wireless communication module 110. Also, the electronic device 100 may be configured to further include a display 151 and a memory 170. It is understood that implementing all of the illustrated components is not a requirement. Greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be a 4G communication network and a 5G communication network, for example.

Referring to FIGS. 1A and 2A, the wireless communication module 110 may include at least one of a 4G wireless communication module 111, a 5G wireless communication module 112, a short-range communication module 113, and a location information module 114. With regard to this, the 4G wireless communication module 111, the 5G wireless communication module 112, the short-range communication module 113, and the location information module 114 may be implemented as a baseband processor such as a modem. As one example, the 4G wireless communication module 111, the 5G wireless communication module 112, the short-range communication module 113, and the location information module 114 may be implemented as a transceiver circuit operating in an IF frequency band and a base processor. Meanwhile, the RF module 1200 may be implemented as an RF transceiver circuit operating in an RF frequency band of each communication system. However, the present disclosure is not limited thereto, and the 4G wireless communication module 111, the 5G wireless communication module 112, the short-range communication module 113, and the location information module 114 may be interpreted to include RF modules, respectively.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) multi-input multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. Meanwhile, a sub-6 frequency band, which is a range under 6 GHz, may be used as the 5G frequency band.

On the other hand, a millimeter wave (mmWave) range may be used as the 5G frequency band to perform broadband high-speed communication. When the mmWave band is used, the electronic device 100 may perform beam forming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement is achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. One example of the wireless area networks is a wireless personal area network.

Meanwhile, short-range communication between electronic devices may be performed using the 4G wireless communication module 111 and the 5G wireless communication module 112. In one embodiment, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and the WiFi communication module 113. In this regard, 4G+WiFi CA may be performed using the 4G wireless communication module 111 and the Wi-Fi communication module 113. Or, 5G+WiFi CA may be performed using the 5G wireless communication module 112 and the WiFi communication module 113.

The location information module 114 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. On the other hand, the input device 120 may include a camera module 121 for inputting an image signal, a microphone 152c or an audio input module for inputting an audio signal, or a user input unit 123 (e.g., a touch key, a push key (or a mechanical key), etc.) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g. RGB (red, green, blue) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio output module 152, a haptic module 153, and an indicator 154.

With regard to this, the display 151 may have an interlayered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may be a liquid crystal display (LCD), a light emitting diode (LED) display, an organic light emitting diode (OLED) display, a microelectromechanical system (micro) electromechanical systems (MEMS) displays, or an electronic paper display. For example, the display 151 may display various contents (e.g., text, images, videos, icons, and/or symbols, etc.). The display 151 may include a touch screen, and may receive a touch, gesture, proximity, or hovering input using, for example, an electronic pen or a part of a user's body.

Meanwhile, the display 151 may include a touch panel 151a, a hologram device 151b, and a projector 151c and/or a control circuit for controlling them. In this regard, the panel may be implemented to be flexible, transparent, or wearable. The panel may include a touch panel 151a and one or more modules. The hologram device 151b may show a stereoscopic image in the air by using interference of light. The projector 151c may display an image by projecting light on a screen. The screen may be located, for example, inside or outside the electronic device 100.

The audio module 152 may be configured to interwork with the receiver 152a, the speaker 152b, and the microphone 152c. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit serves as a passage with various types of external devices connected to the electronic device 100. The wired communication module 160 may include an HDMI 162, a USB 162, a connector/port 163, an optical interface 164, or a D-sub (D-subminiature) 165. Also, the wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in a base station unit. Accordingly, a distributed network may be implemented through the second server 320 implemented as the mobile edge cloud (MEC) 330, and content transmission delay may be shortened.

The memory 170 may include a volatile and/or nonvolatile memory. Also, the memory 170 may include an internal memory 170a and an external memory 170b. The memory 170 may store, for example, commands or data related to at least one of other components of the electronic device 100. According to one embodiment, the memory 170 may store software and/or a program 240. For example, the program 240 may include a kernel 171, middleware 172, an application programming interface (API) 173, an application program (or "application") 174, or the like. At least one of the kernel 171, the middleware 172, or the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may function as an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The processor 180 typically functions to control an overall operation of the electronic device 100, in addition to the operations associated with the application programs. The processor 180 may provide or process information or functions appropriate for a user by processing signals, data, information and the like, which are input or output by the foregoing components, or executing application programs stored in the memory 170. Furthermore, the processor 180 may control at least part of the components illustrated in FIGS. 1A and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be an embedded battery or a replaceable battery. The power management module 191 may include a power management integrated circuit (PMIC), a charging IC, or a battery or fuel gauge. The PMIC may have a wired and/or wireless recharging scheme. The wireless charging scheme may include, e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 396, and a voltage, a current, or a temperature while the battery 396 is being charged. The battery 396 may include, e.g., a rechargeable battery or a solar battery.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320. According to an embodiment, when the electronic device 100 should perform a specific function or service automatically or at a request, the electronic device 100, instead of executing the function or service on its own or additionally, may request another device (e.g., the external device 100a, the first server 310, and the second server 320) to perform at least some functions associated therewith. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. To that end, a cloud computing, distributed computing, client-server computing, or mobile-edge cloud (MEC) technology may be used, for example.

At least part of the components may cooperatively operate to implement an operation, a control or a control method of an electronic device according to various embodiments disclosed herein. Also, the operation, the control or the control method of the electronic device may be implemented on the electronic device by an activation of at least one application program stored in the memory 170.

Referring to FIGS. 1A and 1B, the wireless communication system may include an electronic device 100, at least one external device 100a, a first server 310 and a second server 320. The electronic device 100 may be functionally connected to at least one external device 100a, and may control contents or functions of the electronic device 100 based on information received from the at least one external device 100a. According to one embodiment of the present disclosure, the electronic device 100 may perform authentication to determine whether the at least one external device 100 includes or generates information following a predetermined rule using the servers 310, 320. Also, the electronic device 100 may display contents or control functions by controlling the electronic device 100 based on an authentication result. According to an embodiment of the present disclosure, the electronic device 100 may be connected to at least one external device 100a through a wired or wireless communication interface to receive or transmit information. For example, the electronic device 100 and the at least one external device 100a include a near field communication (NFC), a charger (e.g., Information can be received or transmitted in a universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100a, as an assistant apparatus associated with the electronic device 100, may be a device designed for various purposes, such as ease of use, increased appearance aesthetics, and enhanced usability of the electronic device 100. The at least one external device 100a may or may not be in physical contact with the electronic device 100. According to one embodiment, the at least one external device 100a may be functionally connected to the electronic device 100 using a wired/wireless communication module to control information for controlling content or a function in the electronic device 100.

According to one embodiment, the at least one external device 100a may include an authentication module for encrypting/decrypting at least one of various pieces of information included in the external device information, or storing or managing it in a physical/virtual memory area that is not directly accessible from the outside. According to one embodiment, the at least one external device 100a may perform communication with the electronic device 100 or may provide information through communication between the external devices. According to one embodiment, the at least one external device 100a may be functionally connected to the server 310 or 320. In various embodiments, the at least one external device 100a may be various types of products such as a cover case, an NFC dongle, a car charger, an earphone, an ear cap (e.g., an accessory device mounted on a mobile phone audio connector), a thermometer, an electronic pen, a BT earphone, a BT speaker, a BT dongle, a TV, a refrigerator, and a WiFi dongle.

In this regard, for example, the external device 100a such as a wireless charger may supply power to the electronic device 100 through a charging interface such as a coil. In this case, control information may be exchanged between the external device 100a and the electronic device 100 through in-band communication through a charging interface such as a coil. Meanwhile, control information may be exchanged between the external device 100a and the electronic device 100 through out-of-band communication such as Bluetooth or NFC.

On the other hand, the first server 310 may include a server or a cloud device for a service associated with the at least one external device 100a, or a hub device for controlling a service in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication related server. The second server 320 may include a server or cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 130 may be referred to as a content management server, a content server, or a content related server.

On the other hand, the electronic device 100 described herein may maintain a connection state between a 4G base station (eNB) and a 5G base station (eNB) through the 4G wireless communication module 111 and/or the 5G wireless communication module 112. In this regard, as described above, FIG. 1C illustrates a configuration in which the electronic device 100 is interfaced with a plurality of base stations or network entities.

Referring to FIG. 1C, 4G/5G deployment options are shown. With regard to 4G/5G deployment, when multi-RAT of 4G LTE and 5G NR is supported in a non-standalone (NSA) mode, it may be implemented as EN-DC in option 3 or NGEN-DC in option 5. On the other hand, when multi-RAT is supported in a standalone (SA) mode, it may be implemented as NE-DC in option 4. In addition, when single RAT is supported in a standalone (SA) mode, it may be implemented as NR-DC in option 2.

Operating bands for dual connectivity may be specified to operate in EN-DC, NGEN-DC, or NR-DC configuration. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

With regard to the base station type, the eNB is a 4G base station, which is also called an LTE eNB, and is based on the Rel-8-Rel-14 standard. On the other hand, ng-eNB is an eNB capable of interworking with a 5GC and gNB, which is also called an eLTE eNB, and is based on the Rel-15 standard. Furthermore, the gNB is a 5G base station interworking with a 5G NR and 5GC, which is also called an NR gNB, and is based on the Rel-15 standard. In addition, the en-gNB is a gNB capable of interworking with an EPC and an eNB, also called an NR gNB, and is based on the Rel-15 standard. With regard to the Dual Connectivity (DC) type, option 3 represents E-UTRA-NR Dual Connectivity (EN-DC). Option 7 represents NG-RAN E-UTRA-NR Dual Connectivity (NGEN-DC). Furthermore, option 4 represents NR-E-UTRA Dual Connectivity (NE-DC). Furthermore, option 2 represents NR-NR Dual Connectivity (NR-DC). In this regard, the technical features of double connection according to option 2 through option 7 are as follows.

Option 2: Independent 5G services may be provided with only a 5G system (5GC, gNB). In addition to enhanced Mobile Broadband (eMBB), Ultra-Reliable Low-Latency Communication (URLLC) and Massive Machine Type Communication (mMTC) may be possible, and 5GC features such as network slicing, MEC support, mobility on demand, and access-agnostic may be available to provide a full 5G service. Initially, due to coverage limitations, it may be used as a hot spot, an enterprise or overlay network, and when it is out of a 5G NR coverage, EPC-5GC interworking is required. A 5G NR full coverage may be provided, and dual connectivity (NR-DC) may be supported between gNBs using a plurality of 5G frequencies.

Option 3: This is a case where only a gNB is introduced into the existing LTE infrastructure. The core is an EPC and the gNB is an en-gNB that can interwork with the EPC and the eNB. The dual connectivity (EN-DC) is supported between the eNB and the en-gNB, and the master node is an eNB. An eNB, which is a control anchor of an en-gNB, processes control signaling for network access, connection configuration, handover, etc. of a UE, and user traffic may be transmitted through the eNB and/or the en-gNB. It is an option that is mainly applied to a first stage of 5G migration, as an operator operating an LTE nationwide network is able to quickly build a 5G network with the introduction of the en-gNB and minimal LTE upgrade without 5GC.

There are three types of option 3, which are options 3/3a/3x, depending on the user traffic split schemes. Bearer split is applied to options 3/3x, but is not applied to option 3a. The main scheme is option 7x.

Option 3: Only an eNB is connected to an EPC and an en-gNB is connected only to the eNB. User traffic may be split at a master node (eNB) and transmitted simultaneously to LTE and NR.

Option 3a: Both the eNB and the gNB are connected to the EPC, and thus user traffic is directly transferred from the EPC to the gNB. User traffic is transmitted to LTE or NR.

Option 3x: It is a combination of option 3 and option 3a, which differs from Option 3 in that user traffic is split at the secondary node (gNB).

The advantages of option 3 are i) that LTE can be used as a capacity booster for eMBB services, and ii) the terminal is always connected to LTE to provide service continuity through LTE even if it is out of 5G coverage or NR quality deteriorates so as to provide stable communication.

Option 4: 5GC is introduced, and still interworking with LTE, but independent 5G communication is possible. Core is 5GC, and the eNB is an ng-eNB capable of interworking with 5GC and a gNB. Dual connectivity (NE-DC) is supported between an ng-eNB and a gNB, and the master node is the gNB. LTE may be used as a capacity booster when 5G NR coverage is fully extended. There are two types of option 4, which are option 4/4a. The main scheme is option 7x.

Option 7: 5GC is introduced, and still interworking with LTE, and 5G communication relies on LTE. Core is 5GC, and the eNB is an ng-eNB capable of interworking with 5GC and a gNB. Dual connectivity (NGEN-DC) is supported between an ng-eNB and a gNB, and the master node is a gNB. 5GC features may be used, and when 5G coverage is insufficient yet, service continuity may be provided using an eNB as the master node similar to option 3. There are three types of option 7, which are options 7/7a/7x, depending on the user traffic split schemes. Bearer split is applied to options 7/7x, but is not applied to option 7a. The main scheme is option 7x.

Referring to FIGS. 2B and 2C, the disclosed electronic device 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components are interposed into a space formed between the front case 101 and the rear case 102. At least one middle case may be additionally positioned between the front case 101 and the rear case 102.

A display 151 may be disposed on a front surface of the terminal body to output information. As illustrated, a window 151a of the display 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. Meanwhile, the rear cover 103 may include an opening for externally exposing a camera 121*b* or an audio output module 152*b*.

The electronic device 100 may include a display 151, first and second audio output modules 152*a*, 152*b*, a proximity sensor 141, an illumination sensor 152, an optical output module 154, first and second cameras 121*a*, 121*b*, first and second manipulation units 123*a*, 123*b*, a microphone 152*c*, a wired communication module 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor which senses a touch onto the display so as to receive a control command in a touching manner. When a touch is input to the display 151, the touch sensor may be configured to sense this touch and the processor 180 may generate a control command corresponding to the touch. The content which is input in the touching manner may be a text or numerical value, or a menu item which can be indicated or designated in various modes.

In this manner, the display 151 may form a flexible touch screen along with the touch sensor, and in this case, the touch screen may function as the user input unit 123 (refer to FIG. 1A). Therefore, the touch screen may replace at least some of the functions of the first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the processor 180 may control the optical output unit 154 to end the output of light.

The first camera 121*a* may process video frames such as still or moving images acquired by the image sensor in a video call mode or a capture mode. The processed video frames may be displayed on the display 151 or stored in the memory 170.

The first and second manipulation units 123*a* and 123*b* are examples of the user input unit 123, which may be manipulated by a user to provide input to the electronic device 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

On the other hand, the electronic device 100 may include a finger scan sensor which scans a user's fingerprint. The processor 180 may use fingerprint information sensed by the finger scan sensor as an authentication means. The finger scan sensor may be installed in the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*. The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained. The flash 125 may be disposed adjacent to the second camera 121*b*. When an image of a subject is captured with the camera 121*b*, the flash 125 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication. Furthermore, the microphone 152*c* may be configured to receive the user's voice, other sounds, and the like. The microphone 152*c* may be provided at a plurality of places, and configured to receive stereo sounds.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, a multi-communication system structure and an electronic device including the same according to an embodiment, particularly embodiments related to an antenna and an electronic device including the same in a heterogeneous radio system, will be described with reference to the accompanying drawings. It will be apparent to those skilled in the art that the present disclosure may be embodied in other specific forms without departing from the spirit or essential characteristics thereof.

Meanwhile, a detailed operation and function of an electronic device having a plurality of antennas according to an embodiment provided with the 4G/5G wireless communication module as shown in FIG. 2A will be described below.

In a 5G communication system according to an embodiment, a 5G frequency band may be a higher frequency band than a sub-6 band. For example, the 5G frequency band may be a millimeter wave band, but the present disclosure is not limited thereto and may be changed according to an application.

Figure 3A:
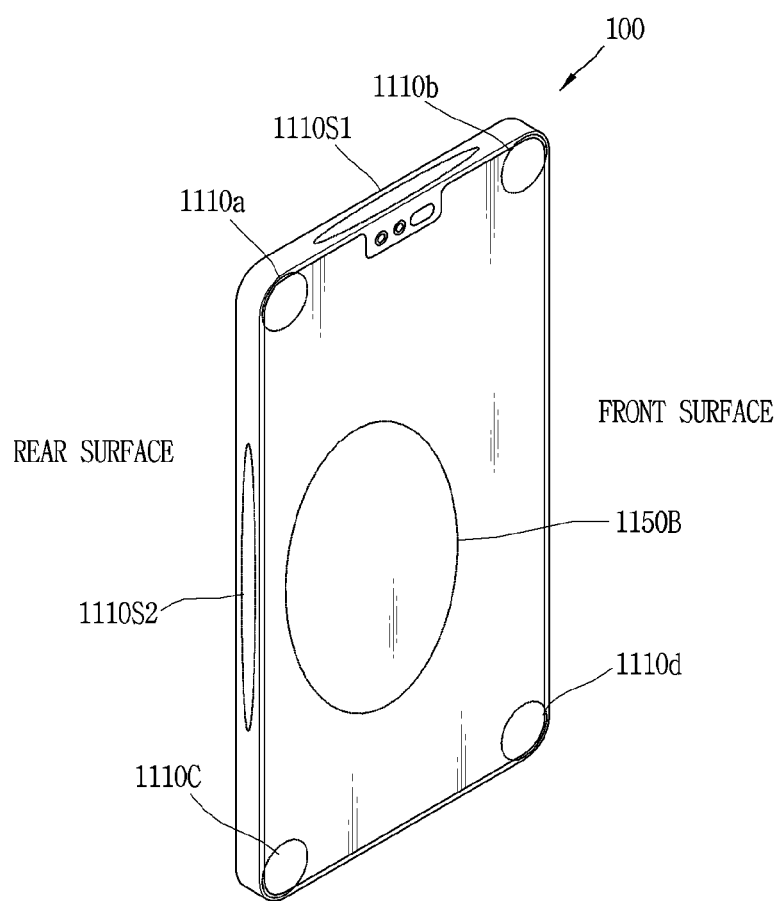
FIG. 3A illustrates an example of a configuration in which a plurality of antennas in an electronic device according to an embodiment can be arranged.

FIG. 3A illustrates an example of a configuration in which a plurality of antennas in an electronic device according to an embodiment can be arranged. Referring to FIG. 3A, a plurality of antennas 1110a to 1110d may be arranged on an inner side of or a front surface of the electronic device 100. In this regard, the plurality of antennas 1110a to 1110d may be implemented in a form printed on a carrier in an electronic device or in a system-on-chip (Soc) form along with an RFIC. Meanwhile, the plurality of antennas 1110a to 1110d may be disposed on a front surface of the electronic device in addition to an inner side of the electronic device. In this regard, the plurality of antennas 1110a to 1110d disposed on a front surface of the electronic device 100 may be implemented as transparent antennas embedded in a display.

On the other hand, a plurality of antennas 1110S1 and 1110S2 may be disposed on a side surface of the electronic device 100. In this regard, a 4G antenna may be disposed on a side surface of the electronic device 100 in the form of a conductive member, and a slot may be disposed in a conductive member region, and the plurality of antennas 1110a to 1110d may be configured to radiate 5G signals through the slot. Furthermore, antennas 1150B may be arranged on a rear surface of the electronic device 100 to radiate 5G signals to the back.

Meanwhile, the present disclosure may transmit or receive at least one signal through the plurality of antennas 1110S1 and 1110S2 on a side surface of the electronic device 100. In addition, the present disclosure may transmit or receive at least one signal through the plurality of antennas 1110a to 1110d, 1150B, 1110S1, and 1110S2 on a front and/or side surface of the electronic device 100. The electronic device may communicate with a base station through any one of the plurality of antennas 1110a to 1110d, 1150B, 1110S1, and 1110S2. Alternatively, the electronic device may perform multi-input multi-output (MIMO) communication with the base station through two or more antennas among the plurality of antennas 1110a to 1110d, 1150B, 1110S1, and 1110S2.

Figure 3B:
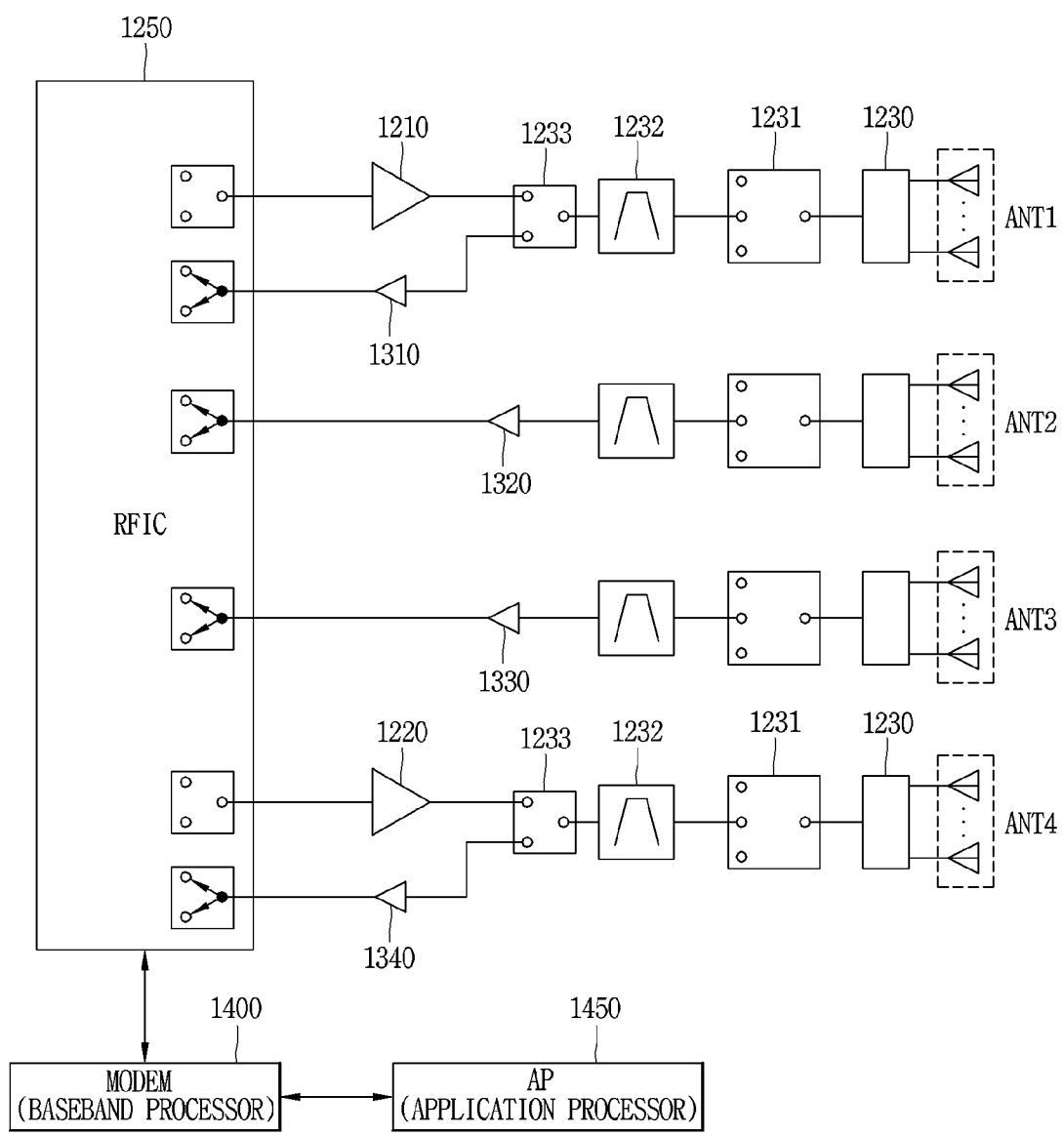
FIG. 3B is a block diagram illustrating a configuration of a wireless communication module of an electronic device operable in a plurality of wireless communication systems according to an embodiment.

FIG. 3B is a block diagram illustrating a configuration of a wireless communication module of an electronic device operable in a plurality of wireless communication systems according to an embodiment. Referring to FIG. 3B, the electronic device includes a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 13110 to 1340 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2B, the RFIC 1250 may be configured as a 4G/5G integrated type, but the present disclosure is not limited thereto. The RFIC 250 may be configured as a 4G/5G separated type according to an application. When the RFIC 1250 is configured as a 4G/5G integration type, it is advantageous in terms of synchronization between 4G/5G circuits, and also there is an advantage that control signaling by the modem 1400 can be simplified.

On the other hand, when the RFIC 1250 is configured as the 4G/5G separated type, the separated RFIDs may be referred to as 4G RFIC and 5G RFIC, respectively. In particular, when a band difference between the 5G band and the 4G band is large, such as when the 5G band is configured as a millimeter wave band, the RFIC 1250 may be configured as a 4G/5G separation type. As such, when the RFIC 1250 is configured as a 4G/5G separation type, there is an advantage that the RF characteristics can be optimized for each of the 4G band and the 5G band.

Meanwhile, even when the RFIC 1250 is configured as a 4G/5G separation type, the 4G RFIC and the 5G RFIC may be logically and functionally separated but physically implemented on a single chip.

On the other hand, the application processor (AP) 1450 is configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate the power circuits of the transmitter and the receiver in a low power mode through the RFIC 1250.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 300, such that at least one of the first and second power amplifiers 110 and 120 operates in the low power mode or is turned off According to another embodiment, the application processor (AP) 500 may control the modem 300 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, the application processor (AP) 500 may control the modem 1400 and the RFIC 1250 to perform short-range communication using only the short-range communication module 113, even at the expense of throughput.

According to another embodiment, when the remaining battery level of the electronic device is above the threshold, the modem 300 may be controlled to select an optimal wireless interface. For example, the application processor (AP) 1450 may control the modem 1400 to receive data through both the 4G base station and the 5G base station according to the remaining battery level and the available radio resource information. In this case, the application processor (AP) 1450 may receive the remaining battery information from the PMIC, and the available radio resource information from the modem 1400. Accordingly, when the remaining battery level and the available radio resources are sufficient, the application processor (AP) 500 may control the modem 1400 and the RFIC 1250 to receive data through both the 4G base station and 5G base station.

Meanwhile, the multi-transceiving system of FIG. 3B may integrate a transmitter and a receiver of each radio system into a single transceiver. Accordingly, there is an advantage in that a circuit portion for integrating two types of system signals may be eliminated at a RF front-end.

Furthermore, since the front-end parts can be controlled by an integrated transceiver, the front-end parts may be more efficiently integrated than when the transceiving system is separated by communication systems.

In addition, upon the separation for each communication system, the control of other communication systems according to necessity is impossible and thereby system delay extends. This makes it impossible to allocate resources efficiently. On the other hand, the multi-transceiving system as illustrated in FIG. 2 has advantages of controlling different communication systems according to necessity and minimizing system delay, which may result in enabling efficient resource allocation.

Meanwhile, the first power amplifier 1210 and the second power amplifier 1220 may operate in at least one of the first and second communication systems. In this regard, when the 5G communication system operates in a 4G band or a sub-6 band, the first and second power amplifiers 1210 and 1220 may operate in both the first and second communication systems.

On the contrary, when the 5G communication system operates in a millimeter wave (mmWave) band, the first and second power amplifiers 1210, 1220 may operate in either the 4G band and the other in the millimeter wave band.

On the other hand, a transmitter and a receiver may be integrated to implement two different wireless communication systems using a single antenna using a dual transmit/receive antenna. In this case, 4×4 MIMO may be implemented using four antennas as illustrated in FIG. 2. In this case, 4×4 DL MIMO may be performed through downlink (DL).

In this regard, multiple-input and multiple-output (MIMO) is a key technology to improve the throughput. It uses multiple antennas both on the transmitter and receiver sides, so as to enable multi-layer data transmission. NR supports multi-layer data transmission for a single UE (single-user MIMO) with a maximum of eight transport layers for DL and four for UL. NR also supports multi-layer data transmission to multiple UEs on different layers (multi-user MIMO) using a maximum of twelve transmission layers for DL and UL transmission.

Reference Signals (RSs) are specified by assuming multi-layer transmission. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook based precoding and non-codebook based precoding are supported. In codebook based UL transmission, precoding matrix applied for PUSCH transmission is selected by gNB. In non-codebook based UL transmission, precoded multiple SRS are transmitted and then gNB selects a desired transmission layer for PUSCH based on the reception of the SRS.

Since NR supports multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmission, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB can decide gNB transmission beamforming for the UE based on the reported L1-RSRP. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE can identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

Meanwhile, when the 5G band is a sub-6 band, first to fourth antennas ANT1 to ANT4 may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but is not limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power PCMAX, c, a lower limit PCMAX_L, c and an upper limit PCMAX_H, c may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented using 4Tx, an additional power amplifier operating in the 5G band may be further provided. Alternatively, a transmission signal may be branched in each of one or two transmission paths, and the branched transmission signals may be connected to the plurality of antennas.

On the other hand, a switch-type splitter or power divider is embedded in an RFIC corresponding to the RFIC 1250. Accordingly, a separate external component is not needed, thereby improving a component mounting configuration. In more detail, a single pole double throw (SPDT) type switch may be provided in the RFIC corresponding to the controller 1250 to select transmitters (TXs) of two different communication systems.

In addition, the electronic device that is operable in the plurality of wireless communication systems according to an embodiment may further include a duplexer 1231, a filter 1232, and a switch 1233.

The duplexer 1231 is configured to separate signals in a transmission band and a reception band from each other. In this case, signals in a transmission band transmitted through the first and second power amplifiers 1210 and 1220 are applied to the antennas ANT1 and ANT4 through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to pass signals in a transmission band or a reception band and block signals in the remaining bands. In this case, the filter 1232 may include a transmission filter connected to the first output port of the duplexer 1231 and a reception filter connected to the second output port of the duplexer 1231. Alternatively, the filter 1232 may be configured to pass only signals in the transmission band or only signals in the reception band according to a control signal.

The switch 1233 is configured to transmit only one of the transmission signal and the reception signal. In an embodiment of the present disclosure, the switch 1233 may be configured in a single-pole double-throw (SPDT) type to separate a transmission signal and a reception signal in a time division duplex (TDD) scheme. Here, the transmission signal and the reception signal are signals of the same frequency band, and thus the duplexer 1231 may be implemented in the form of a circulator.

Meanwhile, in another implementation of the present invention, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, the transmission signal and the reception signal may be separated by the duplexer 1231, and thus the switch 1233 is not necessarily required.

Meanwhile, the electronic device according to an embodiment may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform control of signal transmission and reception through different communication systems using the RFID 1250 and processing of those signals. The modem 1400 may be acquired through control information received from the 4G base station and/or the 5G base station. Here, the control information may be received through a physical downlink control channel (PDCCH), but the present disclosure is not limited thereto.

The modem 1400 may control the RFIC 1250 to transmit and/or receive signals through the first communication system and/or the second communication system at specific time and frequency resources. Accordingly, the RFIC 1250 may control transmitter circuits including the first and second power amplifiers 1210 and 1220 to transmit a 4G signal or a 5G signal at a specific time interval. In addition, the RFIC 1250 may control receiver circuits including the first to fourth low noise amplifiers 310 to 340 to receive a 4G signal or a 5G signal at a specific time interval.

Figure 4:
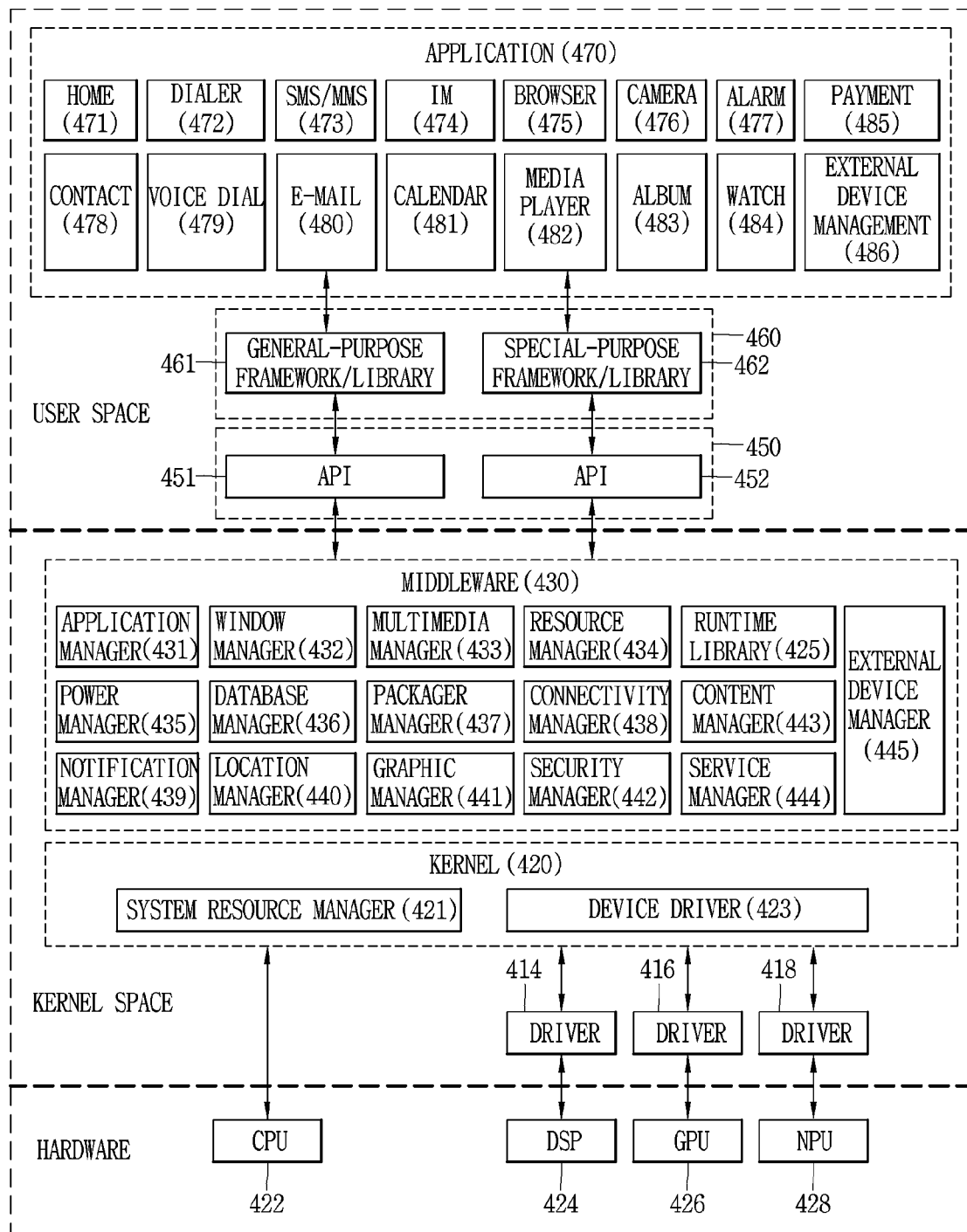
FIG. 4 is a view illustrating a framework structure related to an application program operating in an electronic device according to one embodiment.

Meanwhile, as shown in FIG. 5, an application program operating in the electronic device described herein may be executed by interworking with a user space, a kernel space, and hardware. FIG. 4 is a view illustrating a framework structure related to an application program operating in an electronic device according to one embodiment. In this regard, the program module 410 may include a kernel 420, middleware 430, an API 450, a framework/library 460, and/or an application 470. At least part of the program module 410 may be pre-loaded on an electronic device or downloaded from an external device or a server.

The kernel 420 may include a system resource manager 421 and/or a device driver 423. The system resource manager 421 may perform control, allocation, or retrieval of system resources. According to one embodiment, the system resource manager 421 may include a process manager, a memory manager, or a file system manager. The device driver 423 may include a display driver, a camera driver, a Bluetooth driver, a shared memory driver, a USB driver, a keypad driver, a WiFi driver, an audio driver, or an inter-process communication (IPC) driver. The middleware 430 may provide functions commonly required by the application 470 or provide various functions to the application 470 through the API 460, for example, to allow the application 470 to use limited system resources inside the electronic device.

The middleware 430 may include at least one of a runtime library 425, an application manager 431, a window manager 432, a multimedia manager 433, a resource manager 434, a power manager 435, a database manager 436, a package manager 437, a connectivity manager 438, a notification manager 439, a location manager 440, a graphic manager 441, a security manager 442, a content manager 443, a service manager 444 and an external device manager 445.

The framework/library 460 may include a general-purpose framework/library 461 and a special-purpose framework/library 462. Here, the general-purpose framework/library 461 and the special-purpose framework/library 462 may be referred to as a first framework/library 451 and a second framework/library 452, respectively. The first framework/library 461 and the second framework/library 462 may be interfaced with a kernel space and hardware through the first API 451 and the second API 452, respectively. Here, the second framework/library 452 may be an exemplary software architecture capable of modularizing artificial intelligence (AI) functions. Using the architecture, the various processing blocks of hardware implemented with a System on Chip (SoC) (e.g., CPU 422, DSP 424, GPU 426, and/or NPU 428) may perform functions for supporting operations during the runtime operation of the application 470.

The application 470 may include a home 471, a dialer 472, an SMS/MMS 473, an instant message 474, a browser 475, a camera 476, an alarm 477, a contact 478, a voice dial 479, an email 480, a calendar 481, a media player 482, an album 483, a watch 484, a payment 485, an accessory management 486, a health care, or an environmental information providing application.

An AI application may be configured to call functions defined in a user space capable of allowing the electronic device to provide for detection and recognition of a scene indicating a location at which the electronic device is currently operating. The AI application may configure a microphone and a camera differently depending on whether the recognized scene is an indoor space or an outdoor space. The AI application may make a request for compiled program codes associated with a library defined in a scene detect application programming interface (API) to provide an estimate of the current scene. This request may rely on the output of a deep neural network configured to provide scene estimates based on video and location data.

The framework/library 462, which may be compiled codes of the Runtime Framework, may be further accessible by the AI application. The AI application may cause a runtime framework engine to request scene estimation triggered at specific time intervals or by events detected by the application's user interface. When estimating a scene, the runtime engine may then send a signal to an operating system such as a Linux kernel running on the SoC. The operating system may cause the operation to be performed on the CPU 422, the DSP 424, the GPU 426, the NPU 428, or some combination thereof. The CPU 422 may be accessed directly by the operating system and other processing blocks may be accessed via a driver such as a driver 414 to 418 for the DSP 424, the GPU 426, or the NPU 428. In an illustrative example, a deep neural network and an AI algorithm may be configured to run on a combination of processing blocks, such as the CPU 422 and the GPU 426, or an AI algorithm such as a deep neural network may run on the NPU 428.

The AI algorithm performed through the special-purpose framework/library as described above may be performed only by the electronic device or by a server supported scheme. When the AI algorithm is performed by the server supported scheme, the electronic device may receive and transmit information associated AI processing with the AI server through the 4G/5G communication system.

Meanwhile, referring to FIGS. 1A and 2A, a 5G wireless communication system, that is, 5G new radio access technology (NR) may be provided. In this regard, as more communication devices demand larger communication capacities, there is a need for improved mobile broadband communication as compared to radio access technology in the related art. In addition, massive MTC (Machine Type Communications), which connects multiple devices and objects to provide various services anytime and anywhere, is also one of major issues to be considered in next-generation communication. In addition, communication system design in consideration of services/terminals that are sensitive to reliability and latency is being discussed. As described above, introduction of next-generation radio access technology in consideration of enhanced mobile broadband communication (eMBB), massive MTC (mMTC), ultra-reliable and low latency communication (URLLC), and the like, is being discussed, and the relevant technology is referred to herein as NR for the sake of convenience. The NR is an expression showing an example of 5G radio access technology (RAT).

A new RAT system including the NR uses an OFDM transmission scheme or a similar transmission scheme. The new RAT system may follow OFDM parameters different from the OFDM parameters of LTE. Alternatively, the new RAT system may follow the existing numerology of LTE/LTE-A as it is but have a larger system bandwidth (e.g., 100 MHz). Alternatively, a single cell may support a plurality of numerologies. In other words, electronic devices operating with different numerologies may coexist in a single cell.

In this regard, in the case of 4G LTE, since the maximum bandwidth of the system is limited to 20 MHz, a single sub-carrier spacing (SCS) of 15 KHz is used. However, since 5G NR supports a channel bandwidth between 5 MHz and 400 MHz, FFT processing complexity may increase to process the entire bandwidth through a single subcarrier spacing. Accordingly, the subcarrier spacing used for each frequency band may be extended and applied.

Figure 5A:
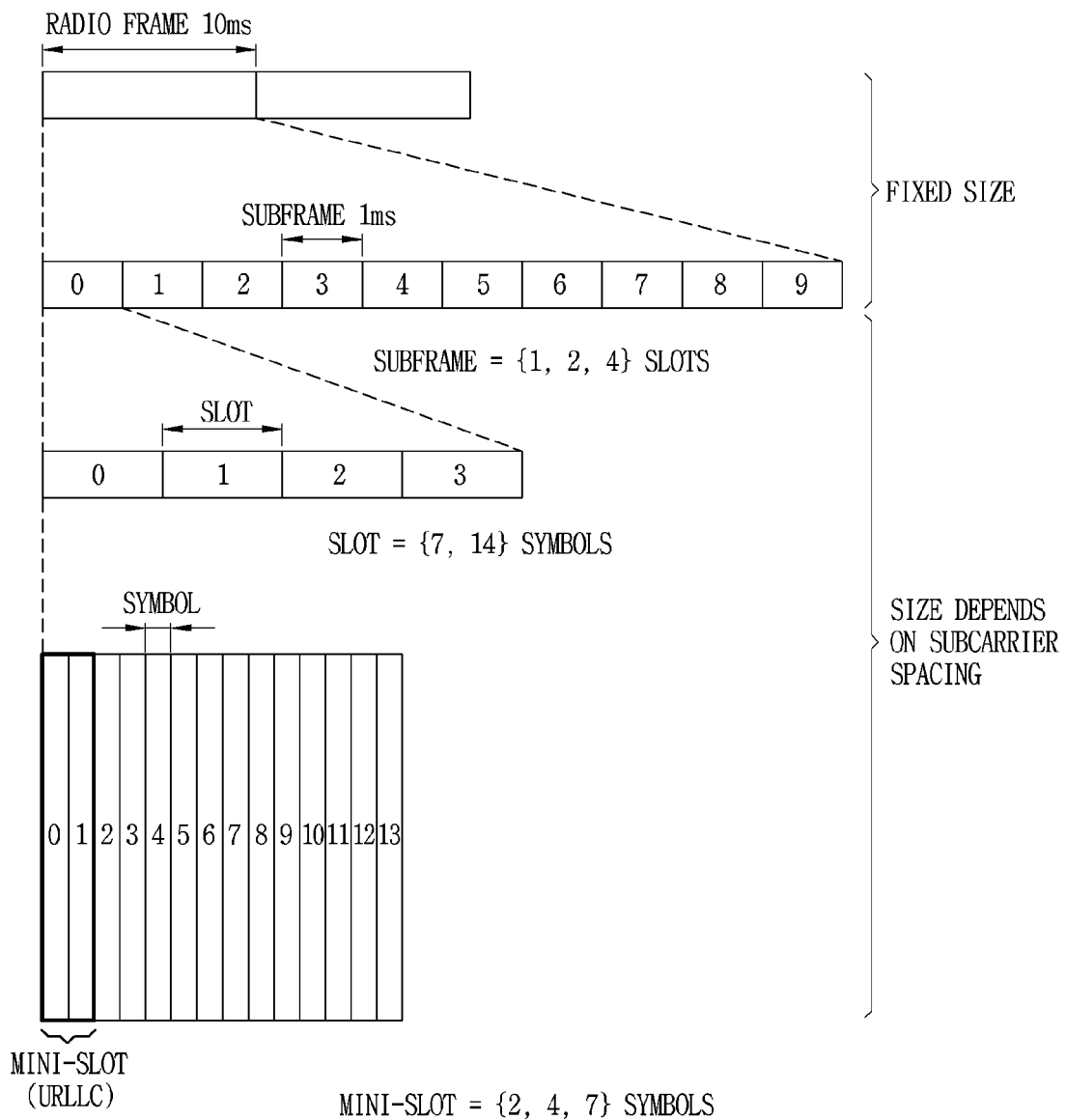
FIG. 5A is a view illustrating an example of a frame structure in NR.

A numerology corresponds to one subcarrier spacing in the frequency domain. By scaling a reference subcarrier spacing to an integer N, different numerologies may be defined. In this regard, FIG. 5A shows an example of a frame structure in NR. FIG. 5B is a view illustrating a change in a slot length in accordance with a change in a subcarrier spacing in the NR.

An NR system may support a number of numerologies. Here, a numerology may be defined by a subcarrier spacing and a cyclic prefix overhead. Here, a plurality of subcarrier spacings may be derived by scaling a basic subcarrier spacing to an integer N. Furthermore, even when it is assumed that a very low subcarrier spacing is not used at a very high carrier frequency, the used numerology may be selected independently of the frequency band. In addition, in an NR system, various frame structures according to a number of numerologies may be supported.

Hereinafter, an Orthogonal Frequency Division Multiplexing (OFDM) numerology and frame structure that can be considered in the NR system will be described. A number of OFDM numerologies supported in the NR system may be defined as shown in Table 1 below.

TABLE 1

| μ | $\Delta f = 2^\mu * 15$ [kHz] | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports a number of numerologies (or subcarrier spacings (SCSs)) for supporting various 5G services. For example, NR supports a wide area in traditional cellular bands when the SCS is 15 kHz, and supports a dense-urban, a lower latency and a wider carrier bandwidth when the SCS is 30 kHz/60 kHz, and supports a bandwidth greater than 24.25 GHz to overcome phase noise when the SCS is 60 kHz or higher. The NR frequency band is defined as a frequency range of two types (FR1, FR2). The FR1 is a sub-6 GHz range, and the FR2 is a range above 6 GHz, which may denote millimeter waves (mmWs). Table 2 below shows the definition of the NR frequency band.

TABLE 21

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

With regard to a frame structure in a NR system, the sizes of various fields in the time domain are expressed in multiples of a specific time unit. FIG. 3A illustrates an example of an SCS of 60 kHz, in which one subframe may include four slots. One example of one subframe={1,2,4} slots is shown in FIG. 3, in which the number of slot(s) that can be included in one subframe may be one, two or four. In addition, a mini-slot may include two, four, or seven symbols or may include more or fewer symbols. Referring to FIG. 5B, a subcarrier spacing of 5G NR phase I and a length of an OFDM symbol corresponding to the spacing are shown. Each subcarrier spacing is extended by a multiplier of two, and the symbol length is inversely reduced. In FR1, subcarrier spacings of 15 kHz, 30 kHz, and 60 kHz may be available, depending on a frequency band/bandwidth. In FR2, subcarrier spacings of 60 kHz and 120 kHz may be used for a data channel, and a subcarrier spring of 240 kHz may be used for a synchronization signal. In 5G NR, a basic unit of scheduling is defined as a slot, and the number of OFDM symbols included in one slot may be limited to fourteen, as illustrated in FIG. 5A or 5B, regardless of the subcarrier spacing. Referring to FIG. 3B, when a wide subcarrier spacing is used, the length of one slot may decrease in inverse proportion to the subcarrier spacing, thereby reducing transmission delay in a wireless section. In addition, in order to efficiently support ultra reliable low latency communication (uRLLC), mini-slot (e.g., 2, 4, 7 symbols) unit scheduling may be supported, as described above, in addition to slot-based scheduling. In consideration of the foregoing technical features, slots in 5G NR described herein may be provided at the same interval as those in 4G LTE or may be provided with slots of various sizes. For an example, in 5G NR, the slot interval may be configured to be 0.5 ms equal to that of 4G LTE. For another example, the slot interval in 5G NR may be configured to be 0.25 ms, which is a narrower interval than that in 4G LTE.

In this regard, the 4G communication system and the 5G communication system may be referred to as a first communication system and a second communication system, respectively. Accordingly, a first signal (first information) of the first communication system may be a signal (information) in a 5G NR frame having a slot interval that is scalable to 0.25 ms, 0.5 ms, and the like. On the contrary, a second signal (second information) of the second communication system may be a signal (information) in a 4G LTE frame having a fixed slot interval of 0.5 ms.

Meanwhile, the first signal of the first communication system may be transmitted and/or received through a maximum bandwidth of 20 MHz. On the contrary, the second signal of the second communication system may be transmitted and/or received through a variable channel bandwidth of 5 MHz to 400 MHz. In this regard, the first signal of the first communication system may be FFT-processed at a single subcarrier spacing (SCS) of 15 KHz.

On the other hand, the second signal of the second communication system may be FFT-processed at subcarrier spacings of 15 kHz, 30 kHz, and 60 kHz according to the frequency band/bandwidth. In this case, the second signal of the second communication system may be modulated and frequency-converted into a FR1 band and transmitted through a 5G sub-6 antenna. Meanwhile, the FR1 band signal received through the 5G sub-6 antenna may be frequency-converted and demodulated. Then, the second signal of the second communication system may be IFFT-processed at subcarrier spacings of 15 kHz, 30 kHz, and 60 kHz according to the frequency band/bandwidth.

On the other hand, the second signal of the second communication system may be FFT-processed at subcarrier spacings of 60 kHz, 120 kHz, and 240 kHz according to the frequency band/bandwidth and data/synchronous channel. In this case, the second signal of the second communication system may be modulated in a FR2 band and transmitted through a 5G mmWave antenna. Meanwhile, the FR2 band signal received through the 5G mmWave antenna may be frequency converted and demodulated. Then, the second signal of the second communication system may be IFFT-processed through subcarrier spacings of 60 kHz, 120 kHz, and 240 kHz according to the frequency band/bandwidth and data/synchronous channel.

In 5G NR, symbol-level time alignment may be used for transmission schemes using various slot lengths, mini-slots, and different subcarrier spacings. Accordingly, the present disclosure provides flexibility to efficiently multiplex various communication services such as enhancement mobile broadband (eMBB) and ultra reliable low latency communication (uRLLC) in the time domain and the frequency domain. In addition, unlike 4G LTE, 5G NR may define uplink/downlink resource allocation at a symbol level within a single slot as shown in FIG. 3. In order to reduce a hybrid automatic repeat request (HARQ) delay, a slot structure capable of directly transmitting HARQ ACK/NACK in a transmission slot may be defined. This slot structure may be referred to as a self-contained structure.

Unlike 4G LTE, 5G NR may support a common frame structure constituting an FDD or TDD frame through a combination of various slots. Accordingly, a dynamic TDD scheme may be adopted to freely dynamically adjust the transmission direction of individual cells according to traffic characteristics.

On the other hand, a detailed operation and function of the electronic device having a plurality of antennas according to an embodiment provided with a multi-transceiving system as shown in FIG. 3B will be discussed below.

Figure 6A:
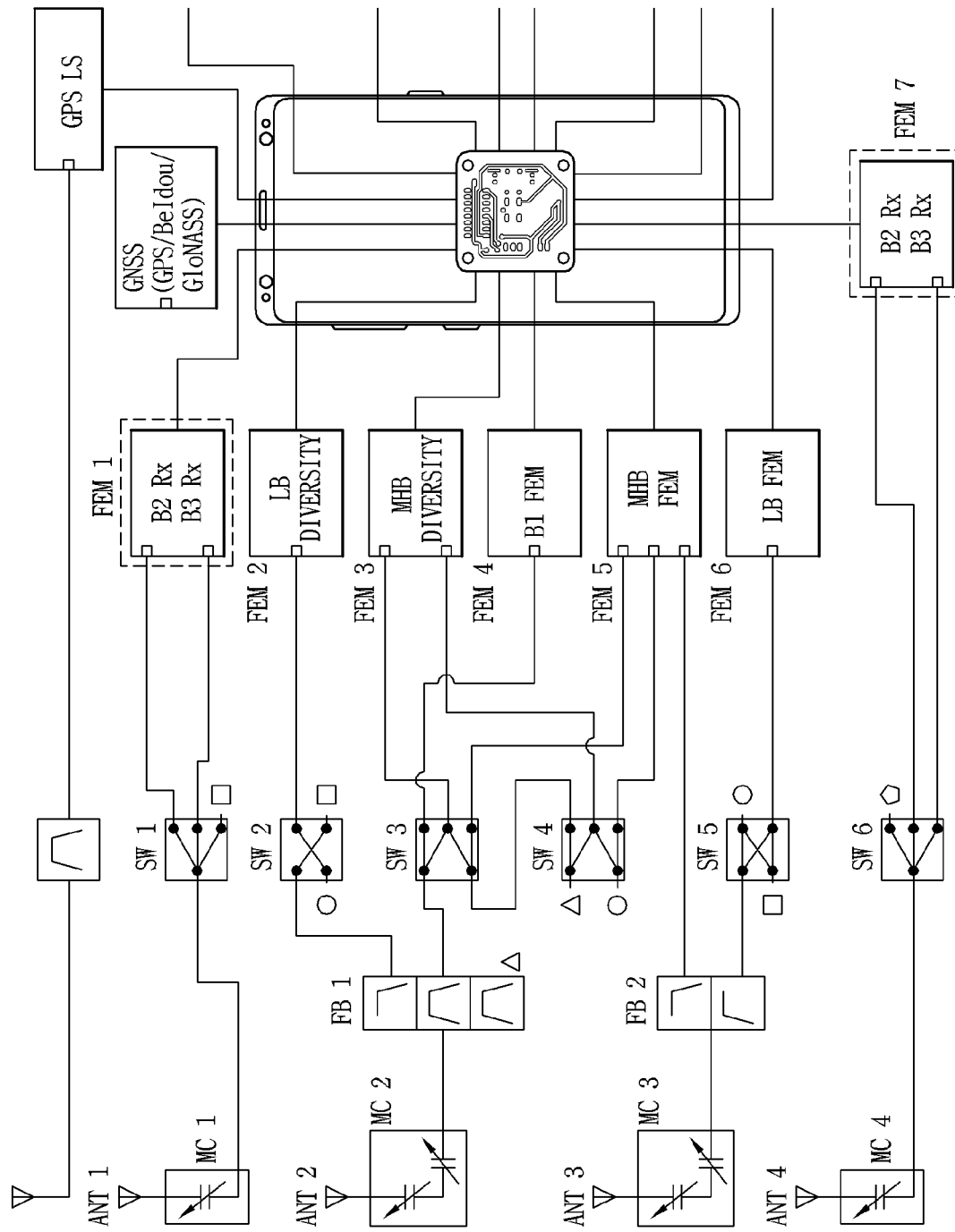
FIG. 6A is a configuration diagram in which a plurality of antennas and transceiver circuits according to an embodiment are coupled to a processor in an operable manner.
Figure 6B:
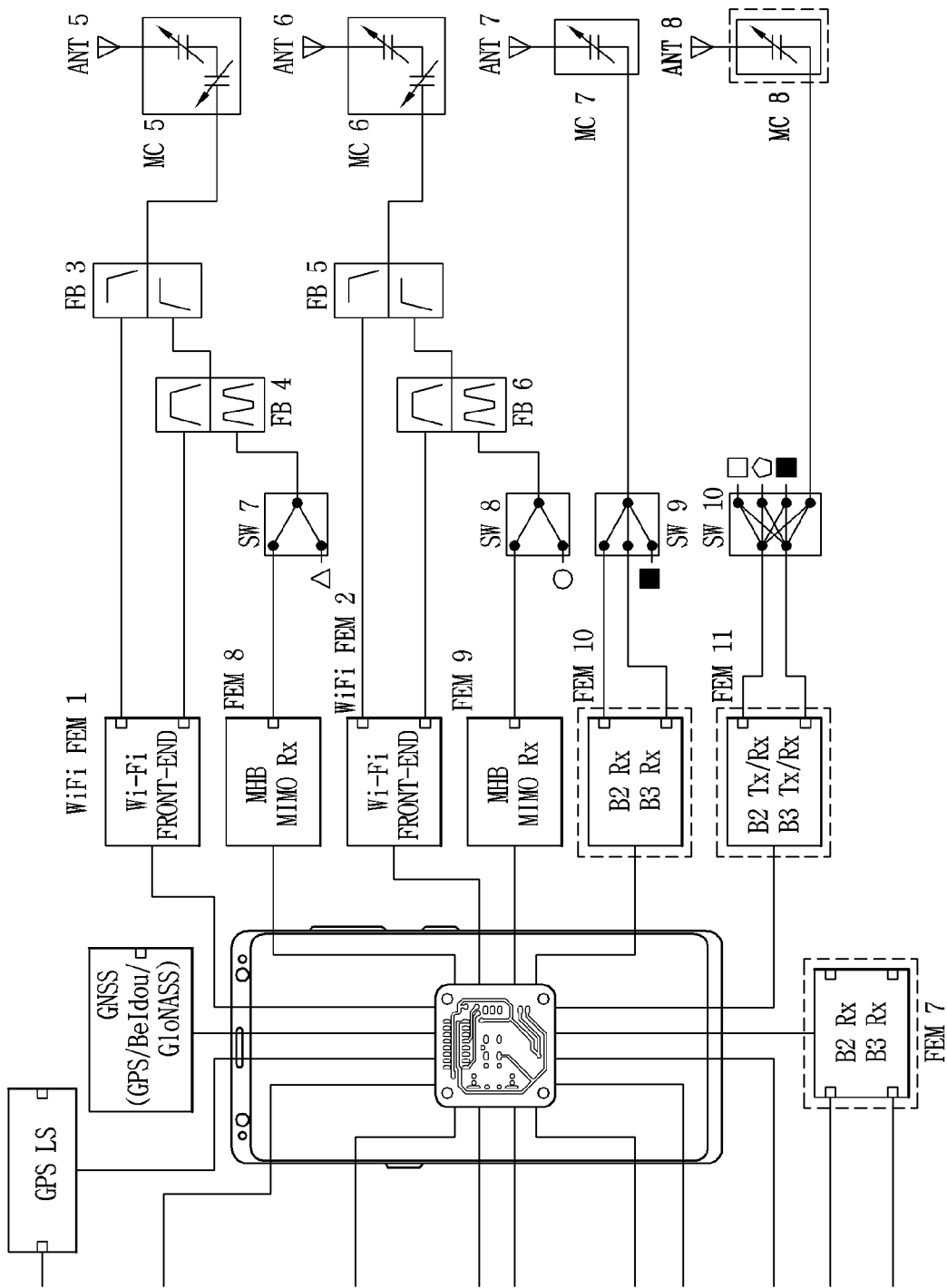
FIG. 6B is a configuration diagram in which antennas and transceiver circuits are additionally coupled to a processor in an operable manner in the configuration diagram in FIG. 6A.

In a 5G communication system according to an embodiment, the 5G frequency band may be a sub-6 band. In this regard, FIG. 6A is a configuration diagram in which a plurality of antennas and transceiver circuits according to an embodiment are coupled to a processor in an operable manner. FIG. 6B is a configuration diagram in which antennas and transceiver circuits are additionally coupled to a processor in an operable manner in the configuration diagram in FIG. 6A.

Referring to FIGS. 6A and 6B, the electronic device may include a plurality of antennas ANT1 to ANT4 and front-end modules FEM1 to FEM7 operating in a 4G band and/or a 5G band. In this regard, a plurality of switches SW1 to SW6 may be arranged between the plurality of antennas ANT1 to ANT4 and the front-end modules FEM1 to FEM7.

Referring to FIGS. 6A and 6B, the electronic device may include a plurality of antennas ANT5 to ANT8 and front-end modules FEM8 to FEM11 operating in a 4G band and/or a 5G band. In this regard, a plurality of switches SW7 to SW10 may be arranged between the plurality of antennas ANT1 to ANT4 and the front-end modules FEM8 to FEM11.

Meanwhile, a plurality of signals that can be branched through the plurality of antennas ANT1 to ANT8 may be transmitted to the input of the front-end modules FEM1 to FEM11 or to the plurality of switches SW1 to SW10 through one or more filters.

For an example, the first antenna ANT1 may be configured to receive signals in a 5G band. In this case, the first antenna ANT1 may be configured to receive a second signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the first antenna ANT1 may also operate as a transmitting antenna in addition to a receiving antenna.

In this regard, the first switch SW1 may be configured as an SP2T switch or an SP3T switch. When implemented as an SP3T switch, one output port may be used as a test port. The first and second output ports of the first switch SW1 may be connected to the inputs of the first front-end module FEM1.

In one example, the second antenna ANT2 may be configured to transmit and/or receive signals in a 4G band and/or a 5G band. In this case, the second antenna ANT2 may be configured to transmit/receive a first signal of a first band B1. Here, the first band B1 may be an n41 band, but the present disclosure is not limited thereto, and the first band B1 may be changed according to an application.

Meanwhile, the second antenna ANT2 may operate in a low-band LB. In addition, the second antenna ANT2 may be configured to operate in a mid-band MB and/or a high-band HB. Here, the middle band MB and high-band HB may be referred to as MHB.

A first output of the first filter bank FB1 connected to the second antenna ANT2 may be connected to the second switch SW2. Meanwhile, a second output of the first filter bank FB1 connected to the second antenna ANT2 may be connected to the third switch SW3. Furthermore, a third output of the first filter bank FB1 connected to the second antenna ANT2 may be connected to the fourth switch SW4.

Accordingly, an output of the second switch SW2 may be connected to an input of the second front-end module FEM2 operating in the low-band LB. Meanwhile, a second output of the third switch SW3 may be connected to an input of the third front-end module FEM3 operating in the MHB band. In addition, a first output of the third switch SW3 may be connected to an input of a fourth front-end module FEM4 operating in a first 5G band B1. Furthermore, a third output of the third switch SW3 may be connected to an input of the fifth front-end module FEM5 operating in the MHB band operating in the first 5G band B1.

In this regard, a first output of the fourth switch SW4 may be connected to an input of the third switch SW3. Meanwhile, a second output of the fourth switch SW4 may be connected to an input of the third front-end module FEM3. In addition, a third output of the fourth switch SW4 may be connected to an input of the fifth front-end module FEM5.

For an example, the third antenna ANT3 may be configured to transmit and/or receive signals in the LB band and/or the MHB band. In this regard, a first output of the second filter bank FB2 connected to the second antenna ANT2 may be connected to an input of the fifth front-end module FEM5 operating in the MHB band. Meanwhile, a second output of the second filter bank FB2 connected to the second antenna ANT2 may be connected to the fifth switch SW5.

In this regard, an output of the fifth switch SW5 may be connected to an input of the sixth front-end module FEM6 operating in the LB band.

For an example, the fourth antenna ANT4 may be configured to transmit and/or receive a signal in a 5G band. In this regard, the fourth antenna ANT4 may be configured such that the second band B2 that is a transmission band and the third band B3 that is a reception band are frequency-division multiplexed FDM. Here, the second band B2 may be an n77 band and the third band B3 may be an n79 band, but the present disclosure is not limited thereto. The second band B2 and the third band B3 may be changed according to an application.

In this regard, the fourth antenna ANT4 may be connected to the sixth switch SW6, and one of the outputs of the sixth switch SW6 may be connected to a reception port of the seventh front-end module FEM7. Meanwhile, another one of the outputs of the sixth switch SW6 may be connected to the transmission port of the seventh front-end module FEM7.

For an example, the fifth antenna ANT5 may be configured to transmit and/or receive signals in a WiFi band. Furthermore, the fifth antenna ANT5 may be configured to transmit and/or receive signals in the MHB band.

In this regard, the fifth antenna ANT5 may be connected to the third filter bank FB3, and a first output of the third filter bank FB3 may be connected to a first WiFi module FEM1. On the other hand, a second output of the third filter bank (FB3) may be connected to a fourth filter bank FB4. In addition, a first output of the fourth filter bank FB4 may be connected to the first WiFi module (WiFi FEM1). Meanwhile, a second output of the fourth filter bank FB4 may be connected to the eighth front-end module FEM8 operating in the MHB band through the seventh switch SW7. Therefore, the fifth antenna ANT5 may be configured to receive WiFi band and 4G/5G band signals.

Similarly, the sixth antenna ANT6 may be configured to transmit and/or receive signals in a WiFi band. Furthermore, the sixth antenna ANT6 may be configured to transmit and/or receive signals in the MHB band.

In this regard, the sixth antenna ANT6 may be connected to a fifth filter bank FB5, and a first output of the fifth filter bank FB5 may be connected to a second WiFi module (WiFi FEM2). On the other hand, a second output of the fifth filter bank FB5 may be connected to a sixth filter bank FB6. In addition, a first output of the sixth filter bank FB6 may be connected to a second WiFi module (WiFi FEM2). A second output of the sixth filter bank FB6 may be connected to the ninth front-end module FEM9 operating in the MHB band through the eighth switch SW8. Therefore, the sixth antenna ANT6 may be configured to receive the WiFi band and 4G/5G band signals.

Referring to FIGS. 3B, 6A, and 6B, the baseband processor, that is, the modem 1400 may control antennas and the transceiver circuit (RFIC) 1250 to perform multi-input multi-output (MIMO) or diversity in the MHB band. In this regard, the second antenna ANT2 and the third antenna ANT3 adjacent thereto may be used in a diversity mode for transmitting and/or receiving the same information as a first signal and a second signal. On the contrary, antennas disposed on different side surfaces may be used in the MIMO mode in which first information is included in the first signal and second information is included in the second signal. For an example, the baseband processor 1400 may perform MIMO through the second antenna ANT2 and the fifth antenna ANT5. For an example, the baseband processor 1400 may perform MIMO through the second antenna ANT2 and the fifth antenna ANT6.

For an example, the seventh antenna ANT7 may be configured to receive signals in a 5G band. In this case, the seventh antenna ANT7 may be configured to receive a third signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the seventh antenna ANT7 may also operate as a transmitting antenna in addition to a receiving antenna.

In this regard, the ninth switch SW9 may be configured as an SP2T switch or an SP3T switch. When implemented as an SP3T switch, one output port may be used as a test port. On the other hand, the first and second output ports of the ninth switch SW9 may be connected to the inputs of the tenth front-end module FEM10.

For an example, the eighth antenna ANT8 may be configured to transmit and/or receive signals in the 4G band and/or the 5G band. In this case, the eighth antenna ANT8 may be configured to transmit/receive a signal of the second band B2. In addition, the eighth antenna ANT8 may be configured to transmit/receive a signal of the third band B3. Here, the second band B2 may be an n77 band and the third band B3 may be an n79 band, but the present disclosure is not limited thereto. The second band B2 and the third band B3 may be changed according to an application. In this regard, the eighth antenna ANT8 may be connected to the eleventh front-end module FEM11 through the tenth switch SW10.

Meanwhile, the antennas (ANT1 to ANT8) may be connected to impedance matching circuits MC1 to MC8 to operate in a plurality of bands. In this regard, when operating in adjacent bands such as the first antenna ANT1, the fourth antenna ANT4, the seventh antenna ANT7 and the eighth antenna ANT8, only one variable element may be used. In this case, the variable element may be a variable capacitor configured to vary the capacitance by varying the voltage.

On the contrary, when operating in spaced bands such as the second antenna ANT2, the third antenna ANT3, the fifth antenna ANT5, and the sixth antenna ANT6, only two or more variable elements may be used. In this case, the two or more variable elements may be two or more variable capacitors or a combination of variable inductors and variable capacitors.

Referring to FIGS. 3B, 6A, and 6B, the baseband processor 1400 may perform MIMO through at least one of the second band B2 and the third band B3 in a 5G band. In this regard, the baseband processor 1400 may perform MIMO through at least two of the first antenna ANT1, the fourth antenna ANT4, the seventh antenna ANT7, and the eighth antenna ANT8 in the second band B2. On the other hand, the baseband processor 1400 may perform MIMO through at least two of the first antenna ANT1, the fourth antenna ANT4, the seventh antenna ANT7, and the eighth antenna ANT8 in the third band B3. Accordingly, the baseband processor 1400 may control the plurality of antennas and the transceiver circuit 1250 to support MIMO up to 4 RXs as well as 2 RXs in the 5G band.

Figure 7A:
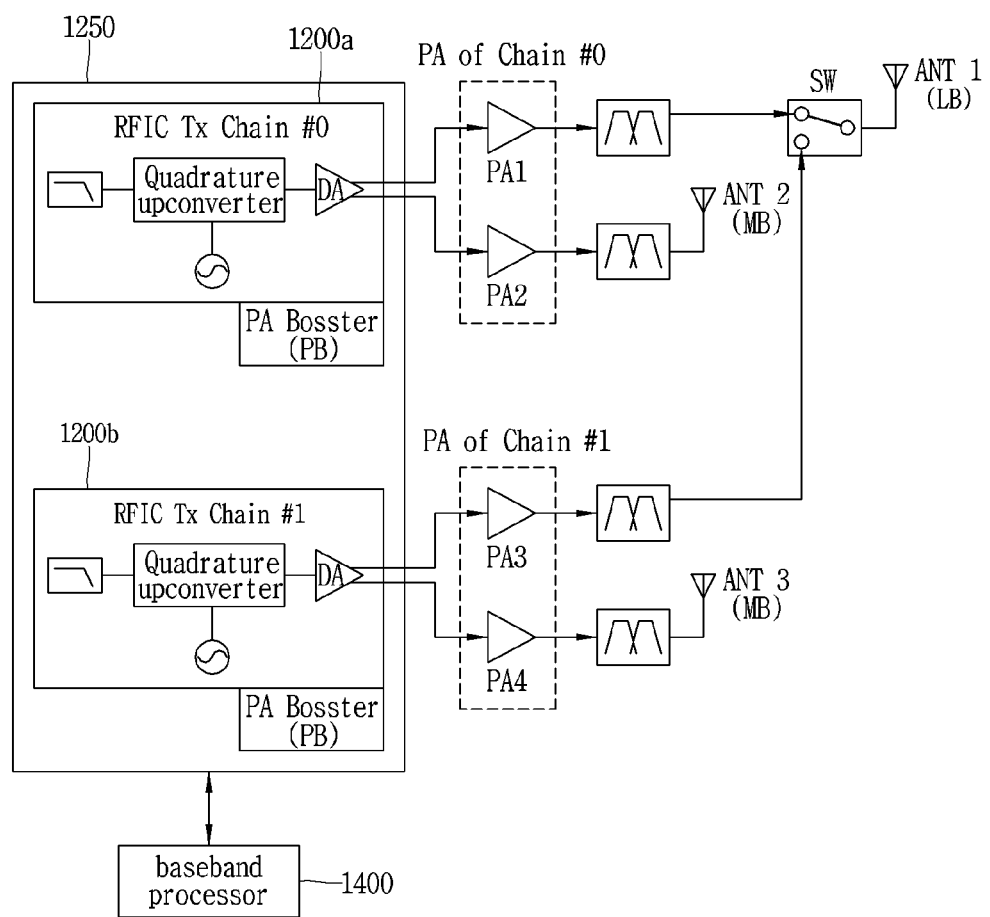
FIG. 7A is a configuration diagram of an electronic device having a plurality of RF chains and a plurality of antennas.

Hereinafter, detailed operations and functions of an electronic device having a plurality of antennas according to an embodiment provided with the multi-transceiving system as illustrated in FIGS. 3B, 6A, and 6B will be described. In this regard, FIG. 7A is a configuration diagram of an electronic device having a plurality of RF chains and a plurality of antennas. FIG. 7B is a view illustrating power amplifiers and antennas through which signals are transmitted in various cases of a stand-alone state and an EN-DC state.

Figure 8A:
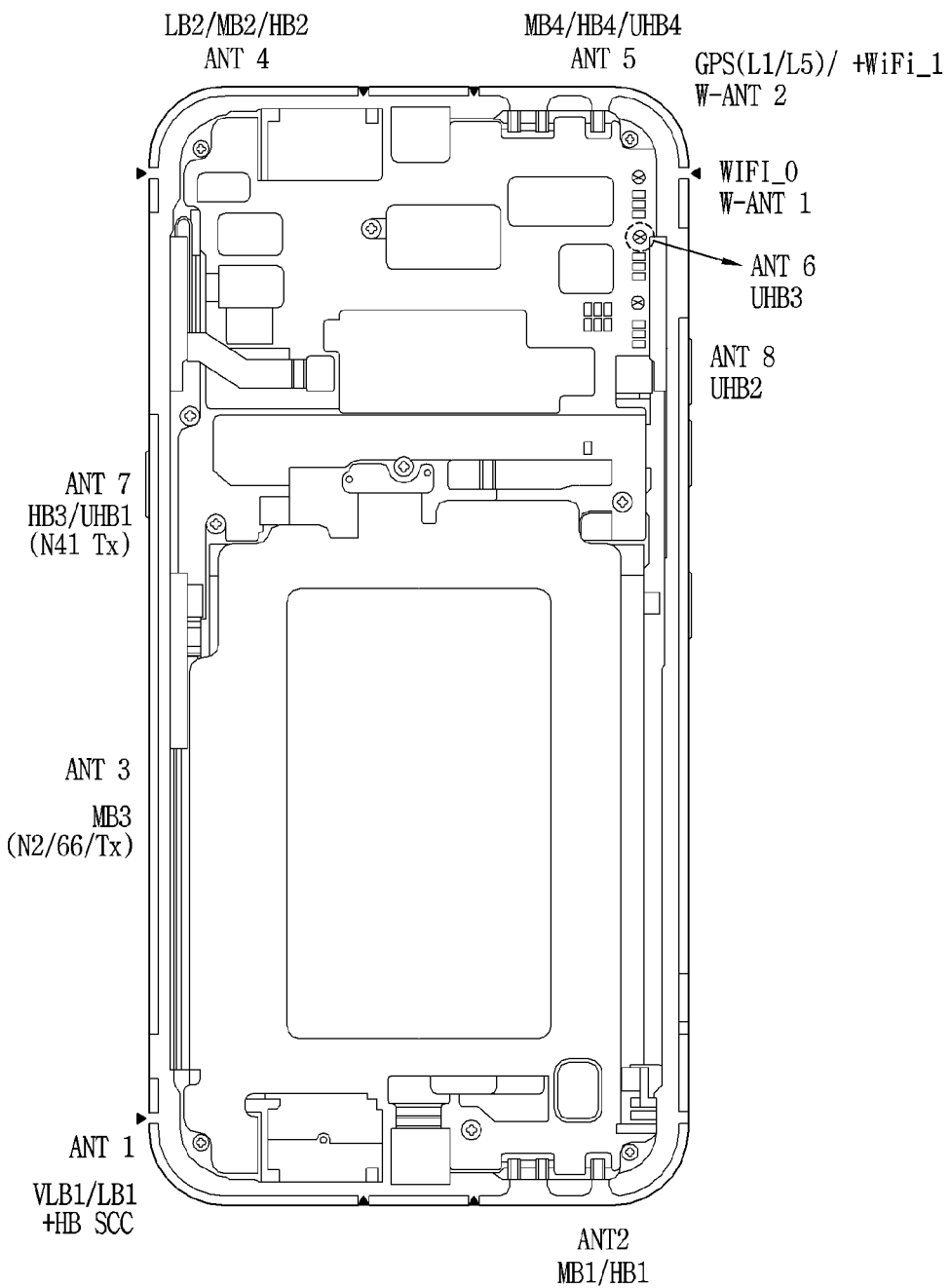
FIGS. 8A to 8C are view illustrating a structure in which a plurality of antennas is arranged along a metal rim of an electronic device in accordance with various embodiments.
Figure 8B:
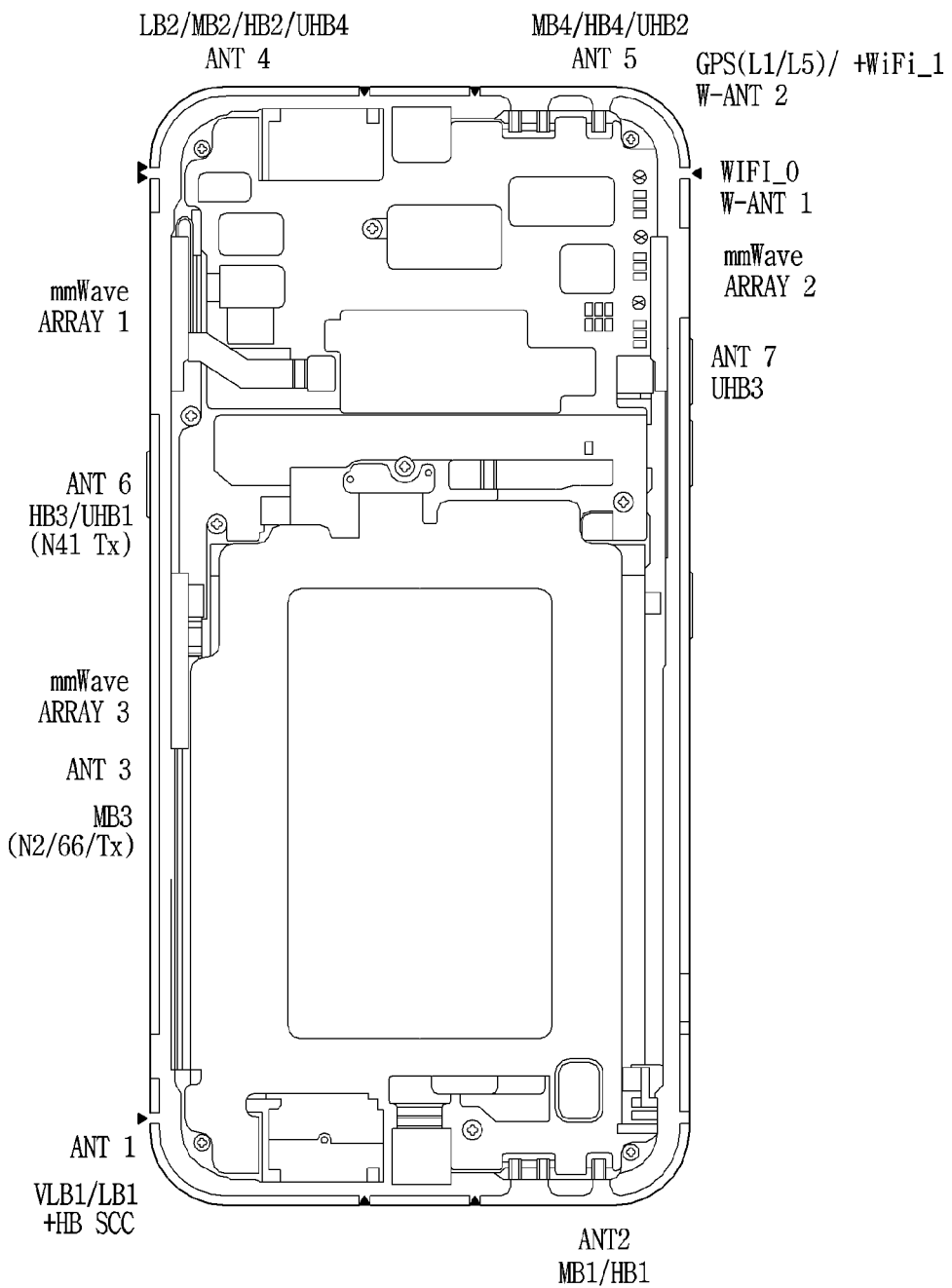
Figure 8C:
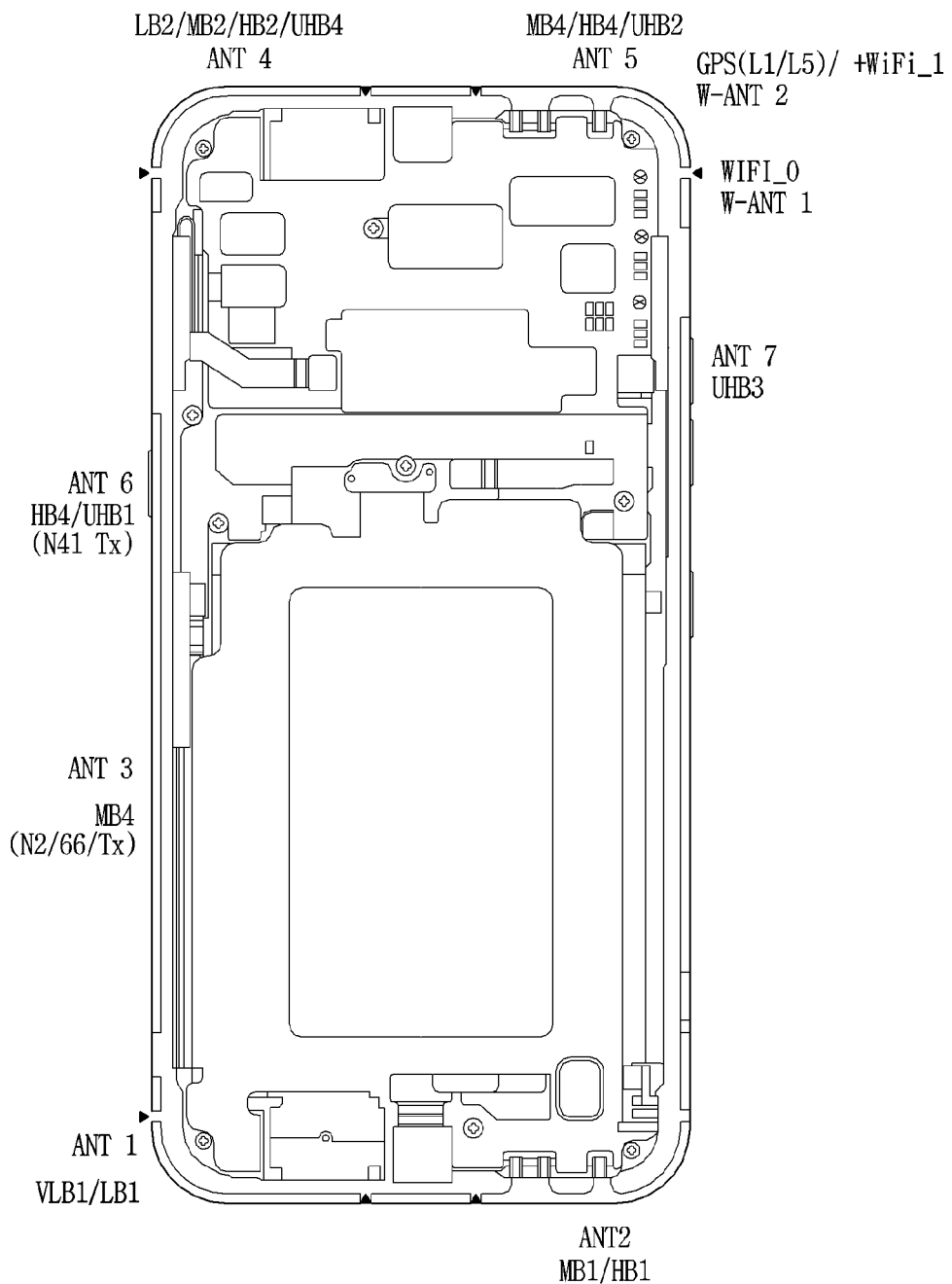

FIGS. 8A to 8C are view illustrating a structure in which a plurality of antennas is arranged along a metal rim of an electronic device in accordance with various embodiments. FIG. 8A illustrates a structure in which a plurality of LTE/5G sub-6 antennas and a plurality of WiFi antennas are disposed on a metal rim of an electronic device. FIG. 8B illustrates a structure in which a plurality of LTE/5G sub-6/mmWave antennas and a plurality of WiFi antennas are disposed on a metal rim of an electronic device. FIG. 8C illustrates a structure in which a plurality of LTE/5G sub-6 antennas and a plurality of WiFi antennas are disposed on a metal rim of an electronic device in accordance with another embodiment.

Referring to FIG. 8A, a plurality of antennas may include first to eighth antennas ANT1 to ANT8. The first antenna ANT1 may be configured to receive and/or transmit signals of a first band corresponding to a low-band LB. For an example, the first antenna ANT1 may be configured to transmit and/or receive signals of the first band corresponding to VLB and LB. In addition, the first antenna ANT1 may be configured to receive and/or transmit signals of a third band corresponding to a high-band (HB) via a secondary component carrier (SBB).

The second antenna ANT2 may be configured to receive and/or transmit signals of a second band corresponding to a medium band (MB) and/or a third band corresponding to a high-band (HB). The third antenna ANT3 may be configured to transmit the signals of the second band corresponding to the medium band (MB). For an example, the third antenna ANT3 may be configured to receive signals of an N2/N66 band.

The fourth antenna ANT4 and the fifth antenna ANT5 may be configured to operate in multiple bands. For an example, the fourth antenna ANT4 and the fifth antenna ANT5 may be configured to receive signals of multiple bands. For example, the fourth antenna ANT4 may be configured to receive signals of the first to third bands of LB/MB/HB. The fifth antenna ANT5 may be configured to receive signals of the second and third bands of MB/HB/UHB. In this case, a signal of an ultra high-band (UHB) may also be regarded as a signal of the third band.

The sixth antenna ANT6 may be configured to receive and/or transmit a signal of the third band corresponding to the UHB. The seventh antenna ANT7 may be configured to receive and/or transmit a signal of the third band corresponding to HB/UHB. For an example, the seventh antenna ANT7 may be configured to receive a signal of an N41 band. The eighth antenna ANT8 may be configured to receive and/or transmit the signal of the third band corresponding to the UHB.

The first WiFi antenna W-ANT1 may be configured to receive and/or transmit a signal of a WiFi band. The second WiFi antenna W-ANT2 may be configured as a GPS antenna while receiving and/or transmitting the signal of the WiFi band. Multiple input/multi output (MIMO) may be performed through the first WiFi antenna W-ANT1 and the second WiFi antenna W-ANT2.

Referring to FIG. 8B, a plurality of mmWave band antenna modules may be disposed on side surfaces of the electronic device. The plurality of mmWave band antenna modules may include first to third array antennas ARRAY1 to ARRAY3. The first array antenna ARRAY1 and the second array antenna ARRAY2 may be respectively disposed on one side surface and another side surface of the electronic device to emit signals in lateral directions. The third array antenna ARRAY3 may be provided with antenna elements that are disposed to emit signals in a rear direction of the electronic device. In the first to third array antennas ARRAY1 to ARRAY3, a plurality of antenna elements may be arranged at predetermined intervals. Beamforming may be performed by controlling a phase of a signal applied to each antenna element arranged at the predetermined interval.

An optimal antenna may be selected among the first to third array antennas ARRAY1 to ARRAY3, and beamforming may be performed through the selected array antenna. As another embodiment, MIMO or diversity may be performed using two or more of the first to third array antennas ARRAY1 to ARRAY3.

First to fifth antennas ANT1 to ANT5 may be configured and/or operated similarly to the configuration and/or operation of the first to fifth antennas ANT1 to ANT5 described in FIG. 8A. The fourth antenna ANT4 may be configured to receive LB/MB/HB/UHB signals. A first WiFi antenna W-ANT1 and a second WiFi antenna W-ANT2 may be configured and/or operated similarly to the first WiFi antenna W-ANT1 and the second WiFi antenna W-ANT2 described in FIG. 8A.

A sixth antenna ANT6 may be configured and/or operated similarly to the seventh antenna ANT7 described in FIG. 8A. The sixth antenna ANT6 may be configured to receive and/or transmit signals of the HB/UHB band. For an example, the sixth antenna ANT6 may be configured to receive a signal of an N41 band. The seventh antenna ANT7 may be configured and/or operated similarly to the sixth antenna ANT6 of FIG. 8A. The seventh antenna AN7 may be configured to receive and/or transmit a signal of the UHB band.

Referring to FIG. 8C, a plurality of antennas configuring a metal rim on side surfaces of an electronic device may be configured and/or operated similarly to the plurality of antenna s of FIG. 8B. For example, the plurality of antennas in FIG. 8C may correspond to the plurality of antennas of FIG. 8B excluding the plurality of mmWave band antenna modules. First to seventh antennas ANT1 to ANT7 of FIG. 8C may correspond to the first to seventh antennas ANT1 to ANT7 of FIG. 8B. A first WiFi antenna W-ANT1 and a second WiFi antenna W-ANT2 of FIG. 8C may correspond to the first WiFi antenna W-ANT1 and the second WiFi antenna W-ANT2 of FIG. 8B.

Figure 9:
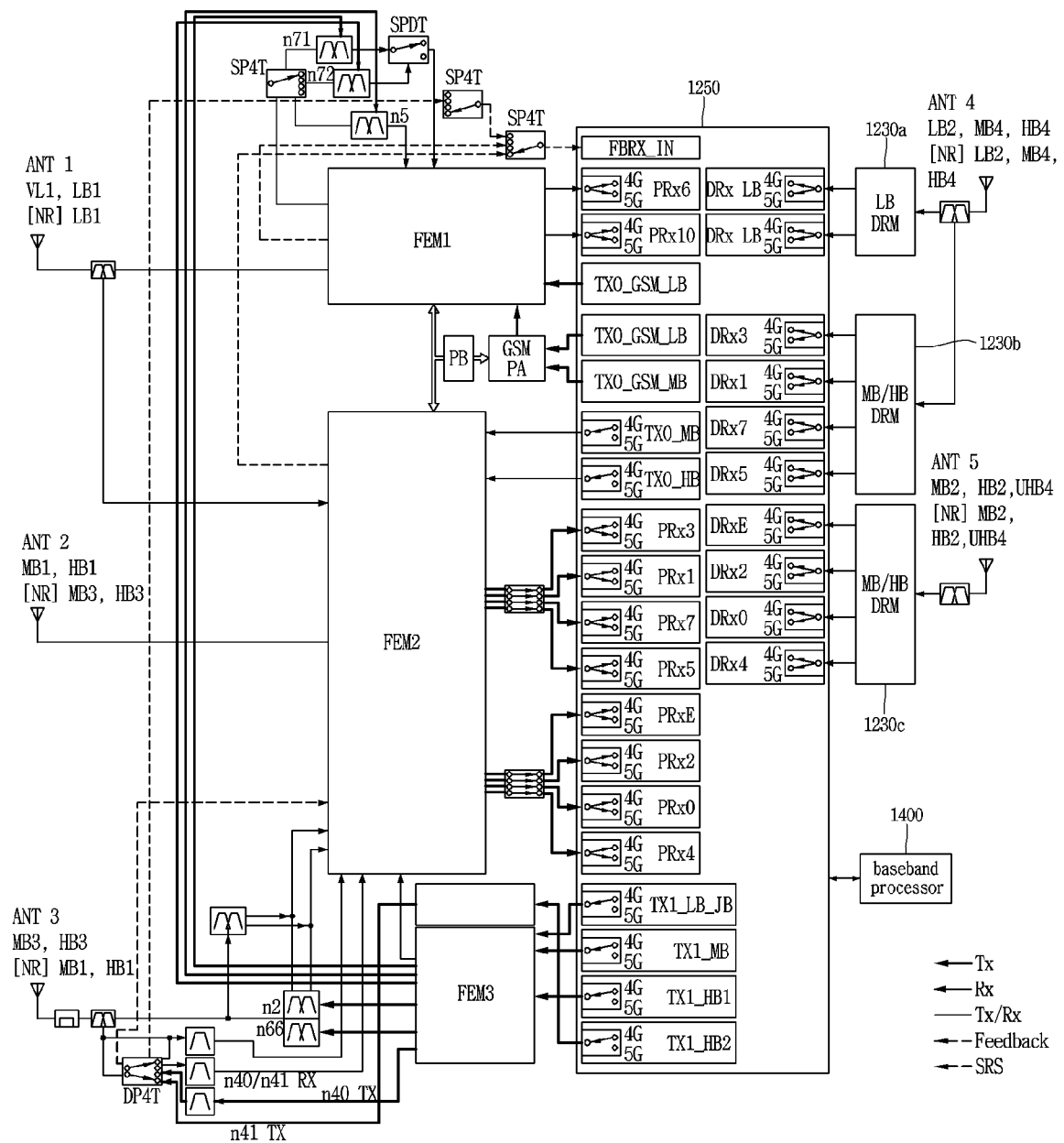
FIG. 9 is a detailed configuration diagram of an electronic device including a transceiver circuit associated with a plurality of RF chains and a processor in accordance with one embodiment.

In this regard, FIG. 9 illustrates a detailed configuration diagram of an electronic device including a transceiver circuit associated with a plurality of RF chains and a processor in accordance with one embodiment.

Referring to FIGS. 7A to 9, an electronic device performing a signal control method may be configured to include first to third antennas ANT1 to ANT3 and first and second transceiver circuits.

In this case, the first antenna ANT1 may be configured to receive a first signal that is an LTE or NR signal of a first band B1. In addition, the first antenna ANT1 may be configured to transmit an LTE or NR signal of the first band. The second antenna ANT2 may be arranged to be spaced apart from the first antenna ANT1 by a predetermined distance, and may be configured to receive a second signal that is an LTE or NR signal of a second band higher than the first band. The second antenna ANT2 may also be configured to transmit the LTE or NR signal of the second band. The second antenna ANT2 may be configured to transmit an LTE or NR signal of a third band higher than the second band. In this regard, the first band, the second band, and the third band may be a low-band LB, a mid-band MB, and a high-band HB, respectively, of the LTE/NR frequency bands. However, the first band, the second band, and the third band are not limited thereto, and may be changed according to applications.

The transceiver circuit 1250 may be operably coupled to the first antenna ANT1 and the second antenna ANT2. The transceiver circuit 1250 may include an RF chain 1200a for amplifying an LTE signal and an RF chain 1200b for amplifying an NR signal.

The RF chain 1200a that amplifies the LTE signal may be referred to as a first transceiver circuit 1200a. The first transceiver circuit 1200a may be operably coupled to the first antenna ANT1. The first transceiver circuit 1200a may be operably coupled to the second antenna ANT2. The RF chain 1200b that amplifies the NR signal may be referred to as a second transceiver circuit 1200b. The second transceiver circuit 1200b may be operably coupled to the first antenna ANT1. The second transceiver circuit 1200b may be operably coupled to the third antenna ANT3.

In this regard, the first transceiver circuit 1200a and the second transceiver circuit 1200b may be referred to as a first RF chain (or module) or a second RF chain (or module), respectively. In this case, both the first RF chain (or module) and the second RF chain (or module) may collectively be referred to as an RF chain (or module). Alternatively, each of the first transceiver circuit 1200a and the second transceiver circuit 1200b may be configured to include a first front-end module FEM1 or a second front-end module FEM2. Alternatively, the first front-end module FEM1 or the second front-end module FEM2 may be configured to include the first transceiver circuit 1200a and the second transceiver circuit 1200b. In this regard, the first front-end module and the second front-end module may collectively be referred to as a front-end module.

Meanwhile, the transceiver circuit 1250 corresponding to the RFIC may be operably coupled to the first transceiver circuit 1200a and the second transceiver circuit 1200b, so as to control the first transceiver circuit 1200a and the second transceiver circuit 1200b. In this regard, the RFIC 1250 may also include a Tx chain 0 corresponding to the first transceiver circuit 1200a and a Tx chain 1 operably coupled to the second transceiver circuit 1200b.

In this regard, the Tx chain 0 and the first front-end module may collectively be referred to as the first transceiver circuit. In addition, the Tx chain 1 and the second front-end module may collectively be referred to as the second front-end module.

On the other hand, the baseband processor 1400 may be operably coupled to the first transceiver circuit 1200a and the second transceiver circuit 1200b. For example, the baseband processor 1400 may be a modem, and may be operably coupled to the first transceiver circuit 1200a and the second transceiver circuit 1200b through the RFIC 1250. Accordingly, the baseband processor 1400 may be configured to control the first transceiver circuit 1200a and the second transceiver circuit 1200b.

The baseband processor 1400 may control the transceiver circuit 1250 to receive a first signal through the first antenna ANT1 and a second signal through the second antenna ANT2. Here, the first signal may be an LTE signal or an NR signal of the first band, but is not limited thereto. In addition, the second signal may be an LTE signal or an NR signal of the second band, but is not limited thereto. The baseband processor 1400 may control a transmission switch SW connected to the first antenna ANT1 such that the LTE signal can be transmitted through the first antenna ANT1 or the NR signal can be transmitted through the first antenna ANT1. The baseband processor 1400 may perform a dual connectivity operation through the first antenna ANT1 and the second antenna ANT2.

In this regard, the first transceiver circuit 1200a may be configured to amplify a signal of a first communication system for transmission. The second transceiver circuit 1200b may be configured to amplify a signal of a second communication system for transmission. Here, the first communication system and the second communication system may be a 4G communication system and a 5G communication system. However, the first communication system and the second communication system are not limited thereto, and may be changed according to applications. As an example, the first transceiver circuit 1200a may be configured to amplify an LTE signal of a 4G communication system for transmission. The second transceiver circuit 1200b may be configured to amplify an NR signal of a 5G communication system for transmission.

The first transceiver circuit 1200a corresponding to the first Tx chain (Tx chain 0) may be configured to output an LTE signal or an NR signal. On the other hand, the second transceiver circuit 1200b corresponding to the second Tx chain (Tx chain 1) may be configured to output an NR signal or an LTE signal. For example, when the first transceiver circuit 1200a outputs an LTE signal, the second transceiver circuit 1200b may be configured to output an NR signal. As another example, when the first transceiver circuit 1200a outputs an NR signal, the second transceiver circuit 1200b may be configured to output an LTE signal.

The first transceiver circuit 1200a and the second transceiver circuit 1200b may be configured to include a filter, an upconverter, and a driving amplifier (DA). The upconverter may be implemented as a quadrature upconverter to perform frequency conversion for I and Q channels. Meanwhile, the upconverter may include a local oscillator configured to generate an LO signal. In addition, the upconverter may further include a frequency mixer configured to generate an RF signal by synthesizing (combining, merging) a baseband (BB) signal and the LO signal.

The first transceiver circuit 1200a may be operably coupled to a first power amplifier PA3 and a second power amplifier PA2. The first power amplifier PA4 may be operably coupled to the first antenna ANT1, and a duplexer may be provided between the first power amplifier PA3 and the first antenna ANT1. When the first antenna ANT1 operates in an LB band, the first power amplifier PA3 may be configured to amplify a signal of the LB band. To this end, the first transceiver circuit 1200a may output the signal of the LB band. In this regard, the second antenna ANT2 may be configured to operate in an MB band. Therefore, when the first antenna ANT1 transmits a signal of an LB band, the second antenna ANT2 commonly connected to the first transceiver circuit 1200a may be configured not to transmit a signal of the MB band but to receive the signal of the MB band.

The second transceiver circuit 1200b may be operably coupled to a third power amplifier PA3 and a fourth power amplifier PA4. The fourth power amplifier PA4 may be operably coupled to the third antenna ANT3, and a duplexer may be provided between the fourth power amplifier PA4 and the third antenna ANT3. When the third antenna ANT3 operates in an MB band, the second transceiver circuit 1200b may be configured to output a signal of the MB band. However, when an output of the third power amplifier PA3 is connected to the first antenna ANT1 through the transmission switch SW, the second transceiver circuit 1200b may be configured to output a signal of an LB band. Therefore, when the first antenna ANT1 connected to the third power amplifier PA3 transmits the signal of the LB band, the third antenna ANT3 commonly connected to the second transceiver circuit 1200b may be configured not to transmit the signal of the MB band but to receive the signal of the MB band.

In the case of the LB, the transmission switch SW may be provided to transmit both Tx signals all to the first antenna ANT1 with respect to both an LTE dedicated circuit path and an NR dedicated circuit path, in order to transmit different Tx signals through one antenna. In this regard, when an LB LTE signal is transmitted through the first antenna ANT1, an MB/HB NR signal may be transmitted through the third antenna ANT3. When an LB NR signal is transmitted through the first antenna ANT1, the MB/HB LTE signal may be transmitted through the second antenna ANT2. Therefore, it may not be configured to simultaneously transmit the LTE signal and the NR signal of the LB band. In this regard, each of the first and second transceiver circuits 1200a and 1200b may be assumed to have one RF transmission chain, but is not limited thereto. Accordingly, when one of the first and second transceiver circuits 1200a and 1200b has a plurality of RF transmission chains, the LTE signal and the NR signal of the LB band may be simultaneously transmitted.

Referring to FIG. 7B, in an LB LTE stand-alone mode, the electronic device may transmit a signal through the first power amplifier PA1 and the first antenna ANT1 of the first front-end module FEM1. In an LB NR stand-alone mode, the electronic device may transmit a signal through the third power amplifier PA3 and the second antenna ANT2 of the second front-end module FEM2.

In an MB/HB LTE stand-alone mode, the electronic device may transmit signals through the second power amplifier PA2 and the second antenna ANT2 of the first front-end module FEM1. Alternatively, in the MB/HB LTE stand-alone mode, the electronic device may transmit a signal through the fourth power amplifier PA4 and the fourth antenna ANT4 of the second front-end module FEM2.

In the MB/HB NR stand-alone mode, the electronic device may transmit a signal through the second power amplifier PA2 and the second antenna ANT2 of the first front-end module FEM1. Alternatively, in the MB/HB LTE stand-alone mode, the electronic device may transmit a signal through the fourth power amplifier PA4 and the fourth antenna ANT4 of the second front-end module FEM2.

The electronic device may configure an EN-DC state or maintain the EN-DC state through different bands. In this regard, the electronic device may configure LB LTE+MB/HB NR EN-DC or maintain the EN-DC state. In this regard, in the LB LTE+MB/HB NR EN-DC mode, the electronic device may be configured to transmit a signal through the fourth power amplifier PA4 and the third antenna ANT3 of the second front-end module FEM2 while transmitting a signal through the first power amplifier PA1 and the first antenna ANT1 of the first front-end module FEM1.

In the LB NR+MB/HB LTE EN-DC mode, the electronic device may be configured to transmit a signal through the third power amplifier PA3 and the first antenna ANT1 of the second front-end module FEM2 while transmitting a signal through the second power amplifier PA2 and the second antenna ANT2 of the first front-end module FEM1.

The electronic device may configure EN-DC or maintain the EN-DC state through the same band. In this regard, the electronic device may configure MB/HB LTE+MB/HB NR EN-DC or maintain the EN-DC state.

In this regard, in the MB/HB LTE+MB/HB NR EN-DC mode, the electronic device may be configured to transmit a signal through the fourth power amplifier PA4 and the third antenna ANT3 of the second front-end module FEM2 while transmitting a signal through the second power amplifier PA2 and the second antenna ANT2 of the first front-end module FEM1.

Referring to FIGS. 7A to 9, the first transceiver circuit 1200a may be operably coupled to the first antenna ANT1 and the second antenna ANT2. The first transceiver circuit 1200a may be operably coupled to the first antenna ANT1 through the transmission switch SW. The first transceiver circuit 1200a may be configured to amplify a signal of a first band and receive and/or transmit the amplified signal. The second transceiver circuit 1200b may be operably coupled to the first antenna ANT1 and the third antenna ANT3. The second transceiver circuit 1200b may be operably coupled to the first antenna ANT1 through the transmission switch SW. The first transceiver circuit 1200b may be configured to amplify a signal of a second band and receive and/or transmit the amplified signal.

The transmission switch SW may be configured to connect a path of the first antenna ANT1 to a path of the first transceiver circuit 1200a or to a path of the second transceiver circuit 1200b. The first antenna ANT1 may be configured to receive and transmit an LTE or NR signal of the first band. The second antenna ANT2 may be configured to receive and transmit an LTE or NR signal of the second band. The third antenna ANT3 may be disposed at a predetermined interval from the first antenna ANT1 or the second antenna ANT2, and may be configured to receive a third signal that is the LTE or NR signal of the second band. In addition, the third antenna ANT3 may be configured to transmit the NR signal of the second band.

Accordingly, the transmission switch SW may be operably coupled to the first transceiver circuit 1200a and the second transceiver circuit 1200b, and may be configured to switch a path of the LTE signal or the NR signal of the first band. In this regard, the baseband processor 1400 may control the connection state of the transmission switch SW to be changed in a subframe before the NR signal is transmitted after the LTE signal is transmitted. In this case, a subframe in which the NR signal is to be transmitted may be pre-configured or indicated by PDCCH or PUCCH. On the other hand, the baseband processor 1400 may control the connection state of the transmission switch SW to be changed in a subframe before the LTE signal is transmitted after the NR signal is transmitted. In this case, the subframe in which the LTE signal is to be transmitted may be pre-configured or indicated by PDCCH or PUCCH.

In the EN-DC state described herein, the electronic device may be in a dual connectivity state with a 4G communication system and a 5G communication system. That is, in the EN-DC state, the electronic device may be in a dual connectivity state with eNB and gNB. In this regard, referring to FIG. 11, the electronic device may be in a dual connectivity state with an NR communication system of a first band LB and an LTE communication system of a second band MB. The baseband processor 1400 may control the transceiver circuit 1250 to transmit an LTE signal of the second band and/or third band through the second antenna ANT2 while transmitting an NR signal of the first band through the first antenna ANT1.

In this regard, the NR signal of the first band may be a low-band NR signal, and the LTE signal of the second band may be a mid-band LTE signal. For example, the NR signal of the first band may be a signal of an N5 band, and the LTE signal of the second band may be a signal of a B66 band, but they are not limited thereto. As another example, the LTE signal of the first band may be a signal of a B5 band, but is not limited thereto. The NR signal of the second band may be a signal of an N66 band, but is not limited thereto.

The first antenna ANT1 may be configured to receive an LTE or NR signal of the first band while transmitting an LTE or NR signal of the first band. The electronic device may be operated in a frequency division duplexing (FDD) mode by transmitting and receiving signals of a first band corresponding to the same band through the first antenna ANT1. The second antenna ANT2 may be configured to receive an LTE or NR signal of the second band. The third antenna ANT3 may be configured to receive an NR signal of the second band while transmitting the LTE or NR signal of the second band. The electronic device may be operated in a frequency division duplexing (FDD) mode by transmitting and receiving signals of the second band corresponding to the same band through the third antenna ANT3.

The baseband processor 1400 may control the transceiver circuit 1250 to transmit the LTE signal of the second band through the second antenna ANT2 while transmitting the NR signal of the first band through the first antenna ANT1. In this regard, FIG. 10 is a view illustrating a structure of a transceiver circuit having Tx chains and Rx chains in an electronic device described herein.

Figure 10:
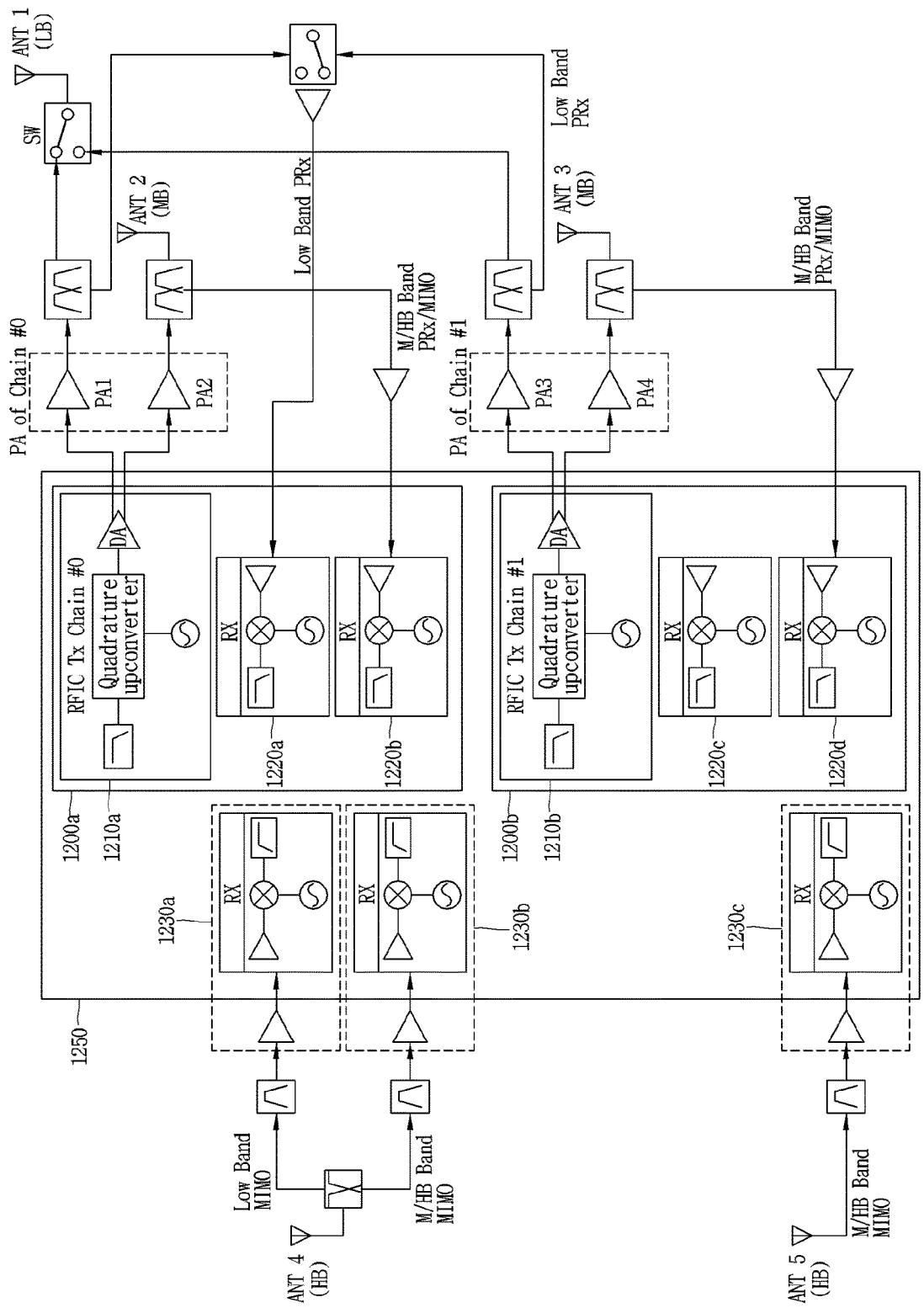
FIG. 10 is a view illustrating a structure of a transceiver circuit having Tx chains and Rx chains in an electronic device described herein.

Referring to FIG. 10, the transceiver circuit 1250 may include a first transceiver circuit 1200*a* and a second transceiver circuit 1200*b*. Each of the first transceiver circuit 1200*a* and the second transceiver circuit 1200*b* may be provided with a transmitter circuit and a receiver circuit. Specifically, the first transceiver circuit 1200*a* may include a first transmitter circuit 1210*a* and first and second receiver circuits 1220*a* and 1220*b*. Also, the second transceiver circuit 1200*b* may include a second transmitter circuit 1210*b* and third and fourth receiver circuits 1220*c* and 1220*d*.

Referring to FIGS. 7A to 10, the electronic device having a dual connectivity configuration such as the EN-DC may be configured to receive signals while transmitting signals. In this regard, the baseband processor 1400 may control the transceiver circuit 1250 to receive the NR signal of the second band through the second antenna ANT2 while transmitting the LTE signal of the first band through the first antenna ANT1. Specifically, the baseband processor 1400 may control the first transceiver circuit 1200*a* to transmit the LTE signal of the first band through the first antenna ANT1. In this regard, the baseband processor 1400 may control a frequency of a local oscillator LO in the first transmitter circuit 1210*a* so that the LTE signal of the first band can be transmitted through the first antenna ANT1.

Also, the baseband processor 1400 may control the transceiver circuit 1250 to receive the NR signal of the second band through the second antenna ANT2. Specifically, the baseband processor 1400 may control the first transceiver circuit 1200*a* to receive the NR signal of the second band through the second antenna ANT2. In this regard, the baseband processor 1400 may control a frequency of a local oscillator LO in the second transmitter circuit 1220*b* so that the NR signal of the second band can be transmitted through the second antenna ANT2.

On the other hand, the baseband processor 1400 may control the transceiver circuit 1250 to transmit the NR signal of the second band through the third antenna ANT3. Specifically, the baseband processor 1400 may control the second transceiver circuit 1200*b* to transmit the NR signal of the second band through the third antenna ANT3. In this regard, the baseband processor 1400 may control the frequency of the local oscillator LO in the second transmitter circuit 1210*b* so that the NR signal of the second band can be transmitted through the third antenna ANT3.

It may be configured to perform carrier aggregation (CA) or maintain a dual connectivity state even in downlink (DL) using a plurality of antennas. In this regard, referring to FIGS. 7A to 9, the baseband processor 1400 may perform CA by receiving the first signal of the first band through the first antenna ANT1 and the second signal of the second band through the second antenna ANT. Alternatively, the baseband processor 1400 may configure a dual connectivity state with a 4G communication system and a 5G communication system or maintain such dual connectivity state by receiving the first signal of the first band through the first antenna ANT1 and the second signal of the second band through the second antenna ANT.

The baseband processor 1400 may perform MIMO by receiving the second signal through the second antenna ANT2 and the third signal through the third antenna ANT3. In this regard, the second antenna ANT2 and the third antenna ANT3 may receive the second signal and the third signal of the same band. The baseband processor 1400 may perform MIMO by receiving the second signal and the third signal of the second band (e.g., N66 band) in the same time interval.

The baseband processor 1400 may configure a dual connectivity state with a 4G communication system and a 5G communication system or maintain such dual connectivity state by receiving the second signal through the second antenna ANT2 and the third signal through the third antenna ANT3.

Figure 11:
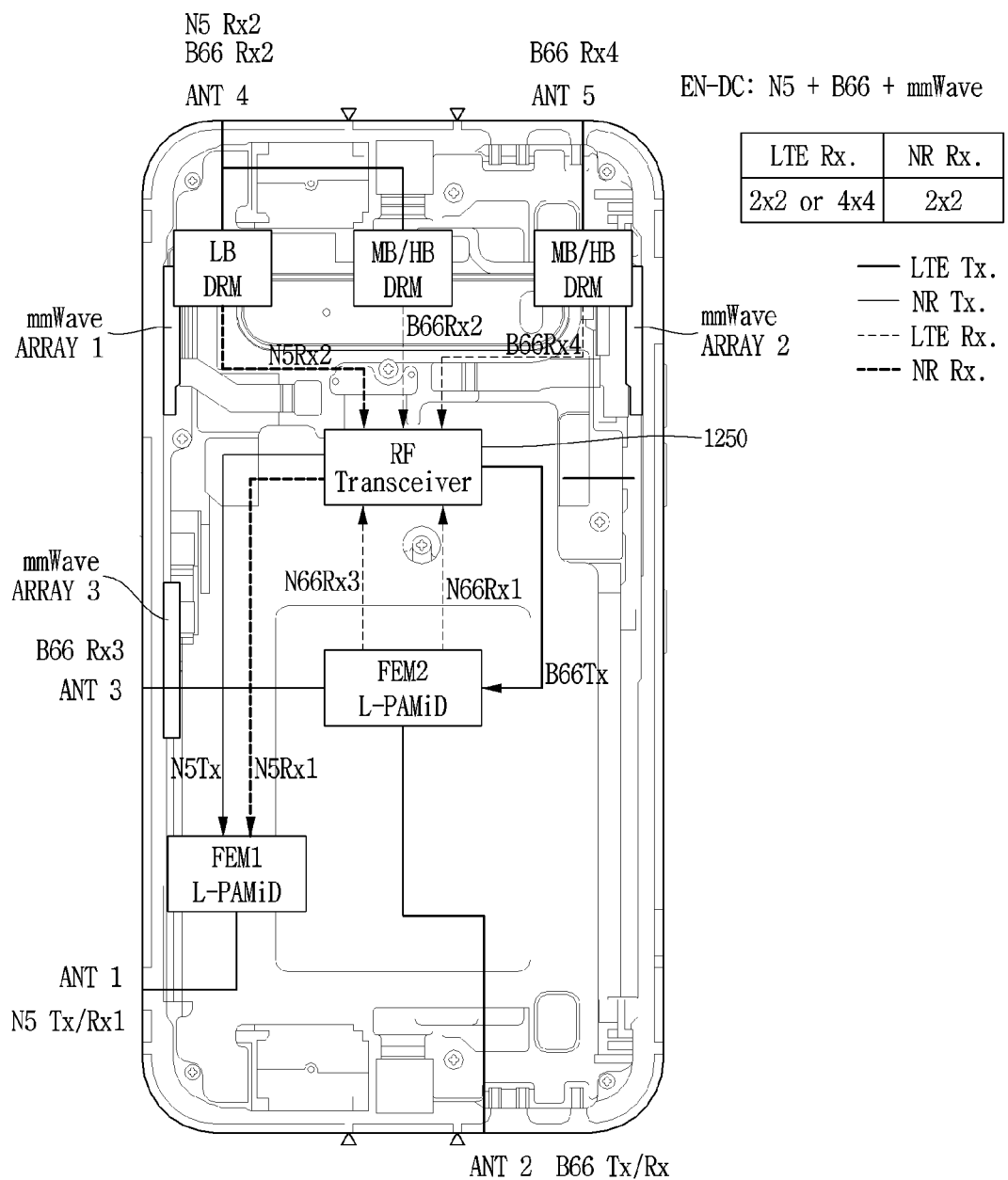
FIG. 11 is a view illustrating a structure in which the antennas and the transceiver circuit of FIG. 9 are arranged in the electronic device.

FIG. 11 is a view illustrating a structure in which the antennas and the transceiver circuit of FIG. 9 are arranged in the electronic device. Referring to FIGS. 7A to 11, a plurality of antennas, such as the first to fifth antennas ANT1 to ANT5, may be disposed along the rim of the electronic device. Meanwhile, FIG. 12 is a view illustrating transmission bands and reception bands of frequency bands in accordance with various embodiments described herein. Referring to FIG. 12, B5/N5 Tx/RX band may be selected as an LB band. B66/N66 Tx/RX band may be selected as an MB band. B41/N41 Tx/RX band may be selected as an HB band. In addition, N78 Tx/RX band may be selected as a UHB band. The aforementioned bands are merely illustrative, and may be variously changed/selected according to applications.

Referring to FIGS. 7A to 11, a plurality of antennas, such as the first to fifth antennas ANT1 to ANT5, may be disposed along the rim of the electronic device.

The electronic device may be configured in a dual connectivity state, namely, an EN-DC state with eNB (LTE base station) and gNB (NR base station) using a plurality of antennas such as the first to fifth antennas ANT1 to ANT5. The dual connectivity (DC) state may be configured as a multi-connectivity state as illustrated in FIG. 10. The multi-connectivity state may be configured as LTE+NR+mmWave. For example, the EN-DC configuration may correspond to N5+B66+mmWave. 4G LTE configuration through a B66 band may be made by up to 4×4 MIMO.

For connectivity with a 5G communication system in the mmWave band, a plurality of array antennas ARRAY1 to ARRAY3 operating in an mmWave band may be used. In this regard, the first array antenna ARRAY1 and the second array antenna ARRAY2 may be configured to emit beam-formed signals through side surfaces of the electronic device. On the other hand, the third array antenna ARRAY3 may be configured to emit beam-formed signals through a rear surface of the electronic device.

When connected to the 5G communication system through mmWave, the connectivity with an NR system in a sub-6 band may be released, but is not limited thereto. If it is connected to the 5G communication system through mmWave and the gNB of the NR system of the sub-6 band is a master base station, the connectivity with the LTE system may be released.

The first antenna ANT1 may be configured as a metal rim on a lower region of the electronic device and one side region connected to the lower region. The first antenna ANT1 may be configured to transmit and/or receive the LTE or NR signal of the first band. For an example, the first antenna ANT1 may be configured to transmit and/or receive a signal of an N5 band corresponding to the first band. In this regard, an N5 Tx band may be 824 to 849 MHz, and a B5

Rx band may be 869 to 894 MHz. As another example, the first antenna ANT1 may be configured to transmit and/or receive a signal of a B5 band corresponding to the first band. Meanwhile, a B5 Tx band may be set to 824 to 849 MHz to be the same as the N5 Tx band. In addition, a B5 Rx band may be set to 869 to 894 MHz to be the same as the N5 Rx band.

The second antenna ANT2 may be configured as the metal rim on the lower region and another side region connected to the lower region. The second antenna ANT2 may be configured to transmit and/or receive the LTE or NR signal of the second band and/or the third band. For an example, the second antenna ANT2 may be configured to transmit and/or receive a signal of a B66 band corresponding to the second band. In this regard, a B66 Tx band may be 1710 to 1780 MHz, and a B66 Rx band may be 2110 to 2200 MHz. On the other hand, the N66 Tx band may be set to 1710 to 1780 MHz to be the same as the B66 Tx band. In addition, the N66 Rx band may be set to 2110 to 2200 MHz to be the same as the B66 Rx band.

The third antenna ANT3 may be configured as the metal rim on one side region, spaced apart a predetermined interval from the first antenna ANT1 due to a dielectric member. The third antenna ANT3 may be configured to transmit and/or receive LTE or NR signals of the second band and/or the third band. In this case, the third antenna ANT3 may be configured to receive a signal of the B66 band corresponding to the second band. As another example, the third antenna ANT3 may be configured to receive a signal of the N66 band corresponding to the second band.

The transceiver circuit 1250 may control the first front-end module FEM1 to transmit and receive the signal of the N5 band through the first antenna ANT1. The transceiver circuit 1250 may control the second front-end module FEM2 to transmit and receive the signal of the B66 band through the second antenna ANT2. The transceiver circuit 1250 may control the second front-end module FEM2 to receive the signal of the B66 band through the second antenna ANT2.

The fourth antenna ANT4 may be configured as the metal rim on an upper region of the electronic device and one side region connected to the upper region. The fourth antenna ANT4 may be arranged to be spaced apart a predetermined interval from the third antenna ANT3, and may be configured to receive a fourth signal that is the LTE or NR signal of the first band and/or the second band. For an example, the fourth antenna ANT4 may be configured to receive the signal of the N5 band. For an example, the fourth antenna ANT4 may be configured to receive the signal of the B66 band. In this regard, the transceiver circuit 1250 may control a diversity RF module (LB DRM) to receive the signal of the N5 band through the fourth antenna ANT4. Also, the transceiver circuit 1250 may control MB/HB DRM to receive the signal of the B66 band through the second fourth antenna ANT4.

The fifth antenna ANT5 may be configured as the metal rim on the upper region and another side region connected to the upper region. The fifth antenna ANT5 may be arranged to be spaced apart a predetermined interval from the fourth antenna ANT4, and may be configured to receive a fifth signal that is the LTE or NR signal of the second band and/or the third band. For an example, the fifth antenna ANT5 may be configured to receive the signal of the B66 band. In this regard, the transceiver circuit 1250 may control MB/HB DRM to receive the signal of the B66 band through the fifth antenna ANT5.

In this regard, a first RF module 1230a corresponding to an LB DRM may be operably coupled to the fourth antenna ANT4 and may be configured to amplify and receive the signal of the first band. A second RF module 1230b corresponding to an MB/HB DRM may be operably coupled to the fourth antenna ANT4, and may be configured to amplify and receive the signals of the second band and the third band. A third RF module 1230c corresponding to the MB/HB DRM may be operably coupled to the fifth antenna ANT5, and may be configured to amplify and receive the signals of the second band and the third band.

The fourth antenna ANT4 may receive the signals of the first band to the third band. The signal of the first band may be transmitted to the first RF module 1230a, and the signals of the second band and the third band may be transferred to the second RF module 1230b. The fifth antenna ANT5 may be configured to receive the signals of the second band and the third band and transmit the signals of the second band and the third band to the third RF module 1230c.

While performing the EN-DC operation through the plurality of antennas, MIMO and/or CA may be performed. In this regard, the baseband processor 1400 may control the transceiver circuit 1250 and the plurality of RF modules to perform the EN-DC operation in the N5+B66 band. The baseband processor 1400 may control the transceiver circuit 1250 and the plurality of RF modules to perform 2×2 DL-MIMO in the first band (e.g., the N5 band) through the first antenna ANT1 and the fourth antenna ANT4. The baseband processor 1400 may control the transceiver circuit 1250 and the plurality of RF modules to perform 4×4 DL-MIMO in the second band (e.g., the B66 band) through the second to fifth antennas ANT2 to ANT5.

MIMO may be performed and/or the dual connectivity state may be configured using a plurality of antennas. In this regard, the baseband processor 1400 may perform MIMO by receiving and/or transmitting signals through two or more antennas of the first to fourth antennas ANT1 to ANT4. In addition, the baseband processor 1400 may perform MIMO by receiving and/or transmitting signals through two or more antennas of the first to fifth antennas ANT1 to ANT5. For example, 2×2 MIMO may be performed in the NR band through the first antenna ANT1 and the fourth antenna ANT4. As another example, 2×2 MIMO or 4×4 MIMO may be performed in the LTE band through the second to fifth antennas ANT2 to ANT5.

On the other hand, the baseband processor 1400 may configure the dual connectivity state with the 4G communication system and the 5G communication system or maintain the configured dual connectivity state by receiving and/or transmitting signals through two or more antennas of the first to fourth antennas ANT1 to ANT4. In addition, the baseband processor 1400 may configure the dual connectivity state with the 4G communication system and the 5G communication system or maintain the configured dual connectivity state by receiving and/or transmitting signals through two or more antennas of the first to fifth antennas ANT1 to ANT5. In this regard, the first antenna ANT1 and the second antenna ANT2 may configure the dual connectivity state with gNB and eNB or maintain the configured dual connectivity state through the N5 band and the B66 band, respectively. To this end, the first antenna ANT1 and the second antenna ANT2 may transmit and/or receive signals of the N5 band and signals of the B66 band, respectively.

With regard to the EN-DC configuration, the dual connectivity state may be configured or maintained through a single antenna. In this regard, the fourth antenna ANT4 may configure the dual connectivity state with gNB and eNB or maintain the configured dual connectivity state through the N5 band and the B66 band. To this end, the fourth antenna ANT4 may receive the signal of the N5 band and the signal of the B66 band.

Meanwhile, the baseband processor 1400 may perform CA such that signals can be transmitted or received through a band in which different bands are aggregated. In this regard, the CA may be performed such that signals can be transmitted or received through a contiguous band or a non-contiguous band. In this regard, the baseband processor 1400 may control the carrier aggregated signal to be transmitted or received through a single antenna. For example, the baseband processor 1400 may control a carrier aggregated signal of the first band and the second band (e.g., N5+B66) to be received through the fourth antenna ANT4. Alternatively, the baseband processor 1400 may control the carrier aggregated signal to be transmitted or received through a plurality of antennas.

Specifically, the baseband processor 1400 may receive signals through at least one antenna of the first to fifth antennas ANT1 to ANT5 to perform the CA over the first to third bands. For example, the baseband processor 1400 may perform the CA over the first to third bands of the LB/MB/HB through the fourth antenna ANT4. In this regard, the baseband processor 1400 may control the LB DRM 1230*a* and the MB/HB DRM 1230*b* to perform the carrier aggregation over the first band to the third band. In this case, the LB DRM 1230*a* and the MB/HB DRM 1230*b* may be referred to as a first RF module 1230*a* and a second RF module 1230*b*, respectively.

The baseband processor 1400 may receive signals through at least two antennas of the first to fifth antennas ANT1 to ANT5 to perform the CA over the first to third bands. For example, the baseband processor 1400 may perform the CA over the first to third bands of the LB/MB/HB through the first antenna ANT1 and the fourth antenna ANT4. As another example, the baseband processor 1400 may perform the CA over the first to third bands of the LB/MB/HB through the first antenna ANT1 and the fifth antenna ANT5. In this regard, the first antenna ANT1 may be configured to receive the signal of the LB band, and the fourth antenna ANT4 or the fifth antenna ANT5 may be configured to receive the signal of the MB/HB band.

Figure 13:
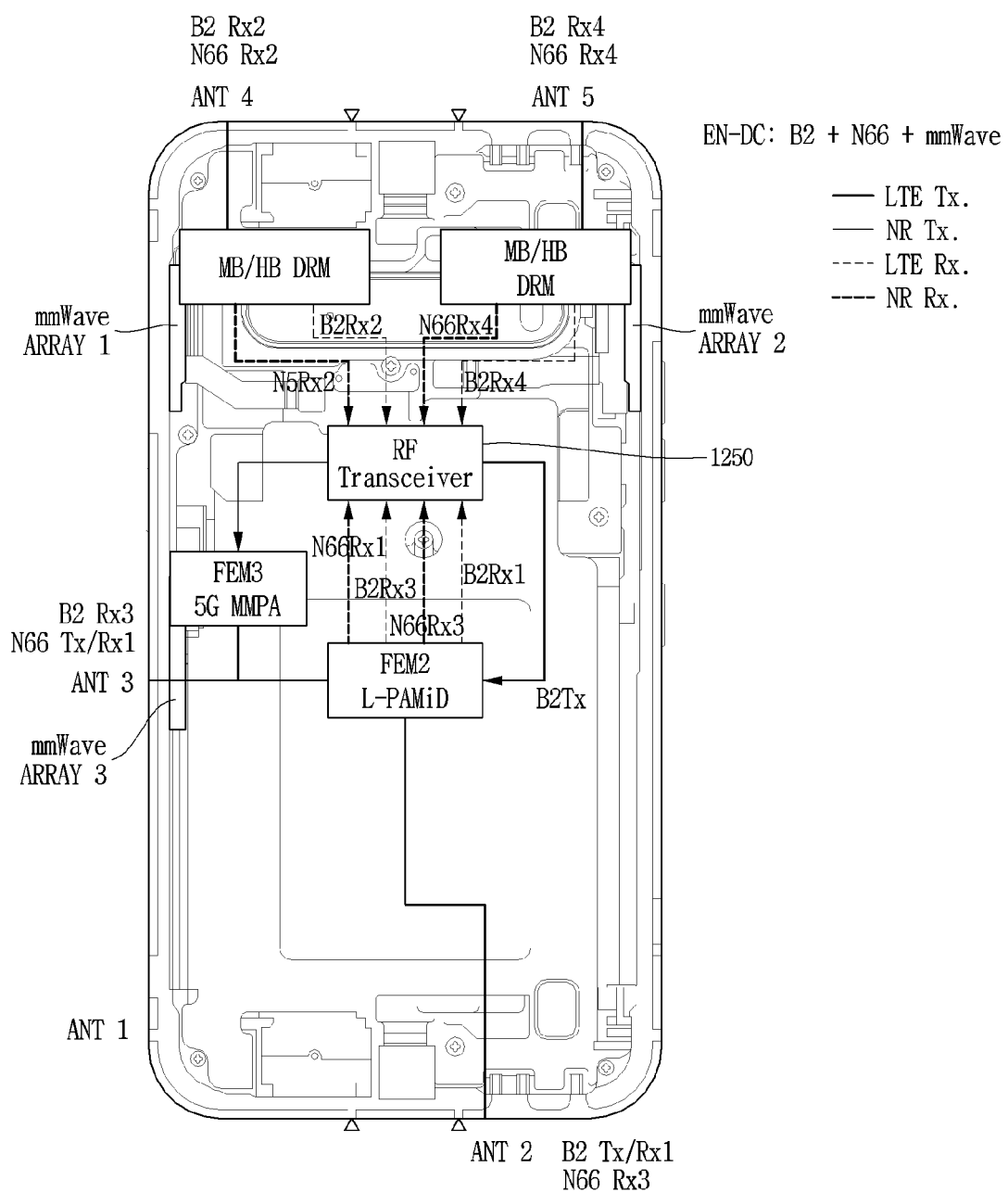
FIGS. 13 and 14 are detailed configuration views of an electronic device including a transceiver circuit associated with a plurality of RF chains and a processor in accordance with different embodiments.
Figure 14:
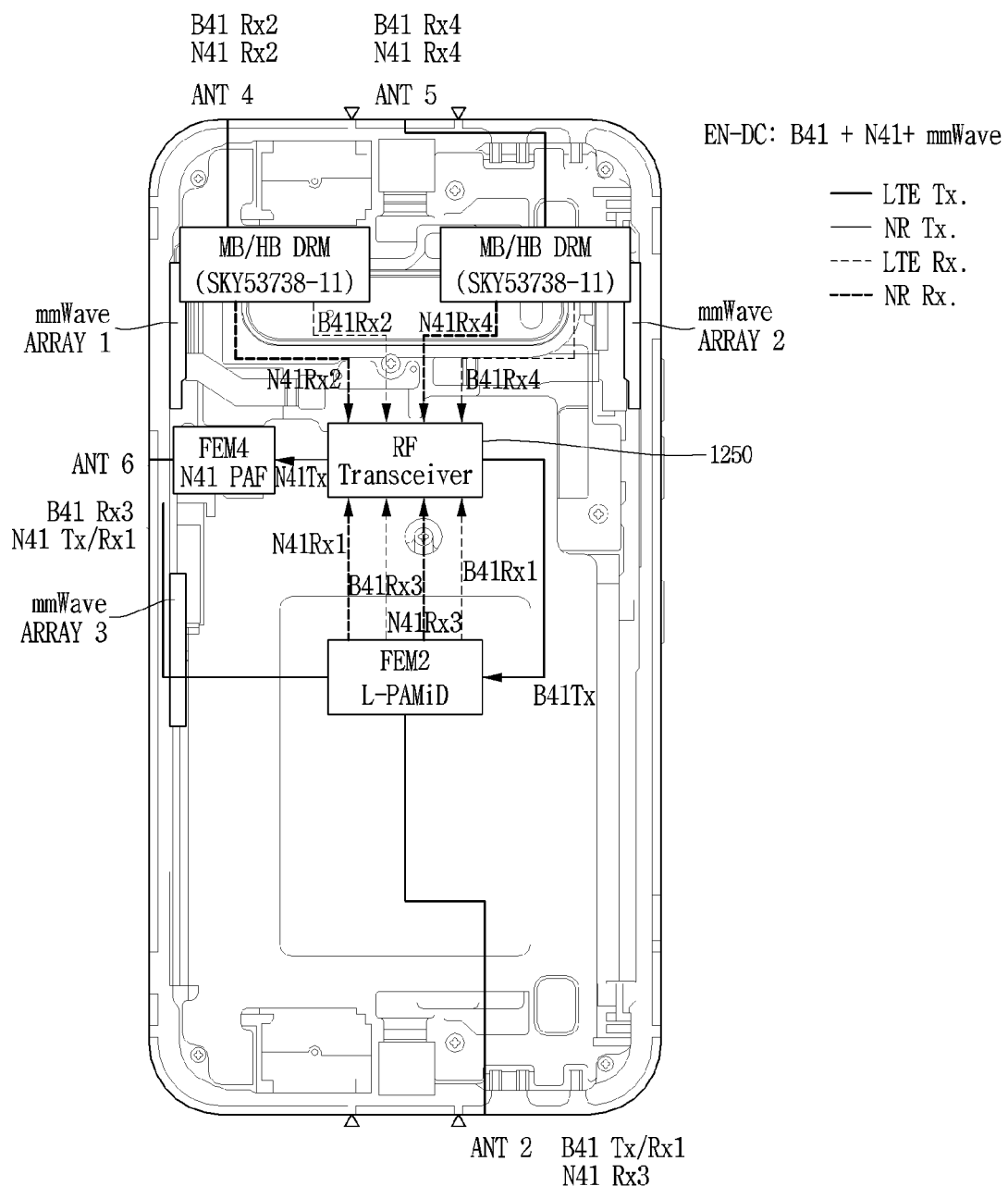

The CA and MIMO operations may be simultaneously performed. In this regard, FIGS. 13 and 14 are detailed configuration views of an electronic device including a transceiver circuit associated with a plurality of RF chains and a processor in accordance with various embodiments. FIG. 13 illustrates a configuration in which the fourth antenna ANT4 and the fifth antenna ANT5 operate in the second band corresponding to the MB band. On the other hand, FIG. 14 illustrates a configuration in which the fourth antenna ANT4 and the fifth antenna ANT5 operate in the third band corresponding to the HB band. In this regard, the configuration of FIG. 13 and the configuration of FIG. 14 represent a configuration disposed in the same electronic device, and a control operation of FIG. 13 and a control operation of FIG. 14 may be performed separately or simultaneously. The control operation in the second band of FIG. 13 and the control operation in the third band of FIG. 14 may be simultaneously performed so that carrier aggregation (CA) can be performed. In this regard, the control operation in the second band of FIG. 13 and the control operation in the third band of FIG. 14 may be performed by a single control command (message).

Referring to FIGS. 7A to 10 and 12 to 14, the electronic device may perform an EN-DC operation through first to sixth antennas ANT1 to ANT6, the transceiver circuit 1250, and the plurality of RF modules. In the EN-DC state, the electronic device may be in a dual connectivity state with a 4G communication system and a 5G communication system. That is, in the EN-DC state, the electronic device may be in a dual connectivity state with eNB and gNB.

Referring to FIG. 13, the electronic device may be in a dual connectivity state with an NR communication system of a second band MB and an LTE communication system of the second band MB.

The electronic device may be configured in a dual connectivity state, namely, an EN-DC state with eNB (LTE base station) and gNB (NR base station) using a plurality of antennas such as the first to fifth antennas ANT1 to ANT5. The dual connectivity (DC) state may be configured as a multi-connectivity state as illustrated in FIG. 10. The multi-connectivity state may be configured as LTE+NR+mmWave. For example, the EN-DC configuration may correspond to B2+N66+mmWave. 4G LTE configuration through a B2 band may be made by up to 4×4 MIMO. 5G NR configuration through an N66 band may be made by up to 4×4 MIMO.

For connectivity with a 5G communication system in an mmWave band, a plurality of array antennas ARRAY1 to ARRAY3 operating in the mmWave band may be used. In this regard, the first array antenna ARRAY1 and the second array antenna ARRAY2 may be configured to emit beam-formed signals through side surfaces of the electronic device. On the other hand, the third array antenna ARRAY3 may be configured to emit beam-formed signals through a rear surface of the electronic device.

When connected to the 5G communication system through mmWave, the connectivity with an NR system in a sub-6 band may be released, but is not limited thereto. If it is connected to the 5G communication system through mmWave and the gNB of the NR system of the sub-6 band is a master base station, the connectivity with the LTE system may be released.

Meanwhile, it may be in the dual connectivity state with the eNB and the gNB through different bands (e.g., B2 and N66 bands) in the second band through the fourth antenna ANT4. Therefore, the electronic device may be in the dual connectivity state with the eNB and the gNB through a B2+N66 band.

It may be in the dual connectivity state with the eNB and the gNB through different bands (e.g., B2 and N66 bands) in the second band through the fifth antenna ANT5. Therefore, the electronic device may be in the dual connectivity state with the eNB and the gNB through a B2+N66 band. In this regard, 2×2 MIMO may be performed through the B2 band of the fourth antenna ANT4 and the fifth antenna ANT5. On the other hand, 4×4 MIMO may be performed in the B2 band through the second to fifth antennas ANT2 to ANT5.

Also, 2×2 MIMO may be performed through the N66 band of the fourth antenna ANT4 and the fifth antenna ANT5. On the other hand, 4×4 MIMO may be performed in the B2 band through the second to fifth antennas ANT2 to ANT5.

Referring to FIG. 14, the electronic device may be in a dual connectivity state with an NR communication system of a third band HB and an LTE communication system of the third band HB.

The electronic device may be configured in a dual connectivity state, namely, an EN-DC state with eNB (LTE base station) and gNB (NR base station) using a plurality of antennas such as the first to sixth antennas ANT1 to ANT6. The dual connectivity (DC) state may be configured as a multi-connectivity state as illustrated in FIG. 10. The multi-connectivity state may be configured by LTE+NR+mmWave. For example, the EN-DC configuration may correspond to B41+N41+mmWave. 4G LTE configuration through a B41 band may be made by up to 4×4 MIMO. 5G NR configuration through an N41 band may be made by up to 4×4 MIMO.

For connectivity with a 5G communication system in an mmWave band, a plurality of array antennas ARRAY1 to ARRAY3 operating in the mmWave band may be used. In this regard, the first array antenna ARRAY1 and the second array antenna ARRAY2 may be configured to emit beam-formed signals through side surfaces of the electronic device. On the other hand, the third array antenna ARRAY3 may be configured to emit beam-formed signals through a rear surface of the electronic device.

When connected to the 5G communication system through mmWave, the connectivity with an NR system in a sub-6 band may be released, but is not limited thereto. If it is connected to the 5G communication system through mmWave and the gNB of the NR system of the sub-6 band is a master base station, the connectivity with the LTE system may be released.

Meanwhile, it may be in a dual connectivity state with the eNB and the gNB through a third band (e.g., B41 and N41 bands) through the fourth antenna ANT4. Therefore, the electronic device can be in the dual connectivity state with the eNB and the gNB through the B41+N41 band.

Meanwhile, it may be in a dual connectivity state with the eNB and the gNB through the third band (e.g., B41 and N41 bands) through the fifth antenna ANT5. Therefore, the electronic device may be in the dual connectivity state with the eNB and the gNB through a B41+N41 band. In this regard, 2×2 MIMO may be performed through the B41 band of the fourth antenna ANT4 and the fifth antenna ANT5. On the other hand, 4×4 MIMO may be performed in the B41 band through the second antenna ANT2 and the fourth to sixth antennas ANT4 to ANT6.

Also, 2×2 MIMO may be performed through the N41 band of the fourth antenna ANT4 and the fifth antenna ANT5. On the other hand, 4×4 MIMO may be performed in the N41 band through the second antenna ANT2 and the fourth to sixth antennas ANT4 to ANT6.

Referring to FIGS. 7A to 10 and 12 to 14, carrier aggregation (CA) and multiple input/multi output (MIMO) operations may be simultaneously performed. In this regard, the baseband processor 1400 may control the second RF module 1230b and the third RF module 1230c to perform MIMO through the fourth antenna ANT4 and the fifth antenna ANT5 while performing CA of the second band and the third band.

Accordingly, the electronic device can perform 2×2 MIMO while performing CA of the second band and the third band. In this regard, the electronic device may be in the EN-DC state with the eNB and the gNB through the B2 band and the N66 band in the second band. Also, the electronic device may be in the EN-DC state with the eNB and the gNB through the B41 band and the N41 band in the third band. Accordingly, in the EN-DC state, the electronic device can simultaneously perform the CA and MIMO operations.

The dual connectivity state described herein may be specified such that the electronic device is operated in an EN-DC, NGEN-DC, or NR-DC configuration as illustrated in FIG. 1C. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. The configured output power for EN-DC and the configured output power for NR-DC may be defined.

Figure 15:
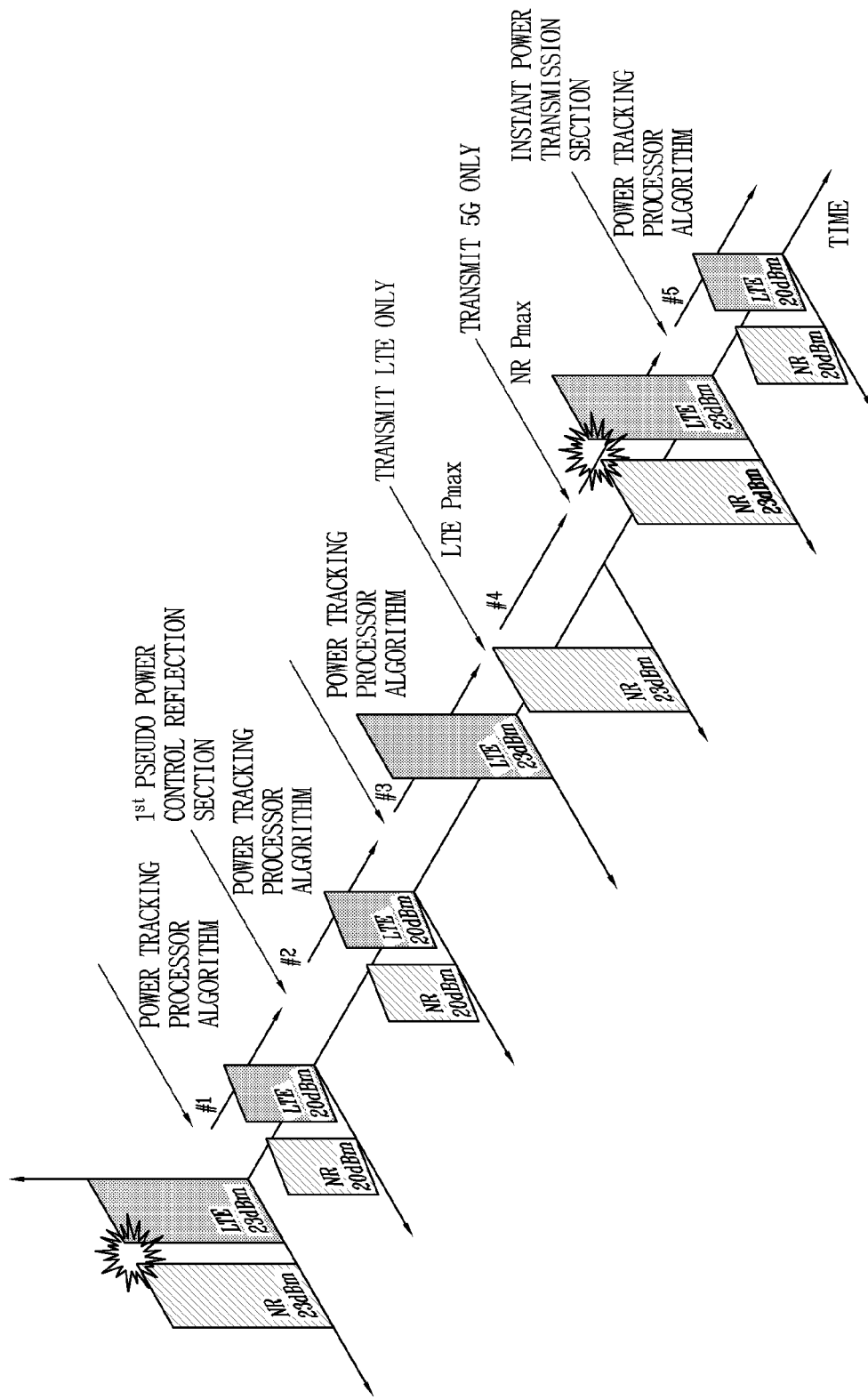
FIG. 15 is a conceptual view illustrating a power control method based on total transmission power over time in a plurality of communication systems in accordance with the present disclosure.

In this regard, FIG. 15 is a conceptual view illustrating a power control method based on total transmission power over time in a plurality of communication systems in accordance with the present disclosure. Referring to FIG. 15, a power control method based on a predetermined time interval is illustrated, but is not limited thereto, and is applicable to an event-based control method according to total transmission power (or a time average value thereof). Therefore, the power control method of FIG. 15 may be associated with UE maximum output power, UE maximum output power reduction, and configured output power.

Time #1 is a start point of a section in which first and second signals are output through dual transmission in dual connectivity (DC)2-tx, that is, a dual connectivity state. At this time, if power measurement is performed to control initial transmission power, a problem that an initial transmission time is delayed may occur. Therefore, in the first Tx period section, signals are preferentially output without transmission power measurement and control.

However, thereafter, in a situation where the DC state has been recognized, power tracking is performed for at least one (e.g., 4G transmission) of two transmissions. According to this power tracking, the maximum allowable power value may be limited to a specific value, for example, 20 dBm from time #2.

Meanwhile, the power tracking method is also performed at time #3. Then, at the time #3, a single transmission may be performed through a single transmission system. For example, when performing a single transmission only through a first communication system (4G/LTE communication system), total transmission power may be limited to 23 dBm, which is LTE Max power. This allows fallback to the single transmission operation through the first communication system.

Meanwhile, as seen at time #5, when a DC operation is performed again, a terminal immediately checks total transmission power or at least one of first and second power values. Accordingly, the terminal checks whether the total transmission power exceeds a threshold value (23 dBm) or the at least one of the first and second power values exceeds a specific value (20 dBm). At this time, the terminal may limit Pmax of the first and second communication systems to a specific value, respectively, for example, 20 dBm.

Hereinafter, a detailed operation of the electronic device performing a power control in a plurality of communication systems capable of configuring an EN-DC state will be described. Referring to FIGS. 7A to 15, the first power amplifier is configured to amplify a first signal to a first power value. On the other hand, the second power amplifier is configured to amplify a second signal to a second power value. Here, the first power amplifier may be a power amplifier operating in the first communication system, among the first to fourth power amplifiers PA1 to PA4 of FIG. 7A. The second power amplifier may be a power amplifier operating in the second communication system, among the first to fourth power amplifiers PA1 to PA4 of FIG. 7A.

In this regard, when 5G NR uses a 4G LTE band, first and second frequency bands associated with the first and second signals may overlap at least partially. In addition, when the 5G NR uses frequency bands different from the 4G band, the first and second frequency bands associated with the first and second signals may be spaced apart from each other without overlapping.

When simultaneously transmitting the first and second signals, the baseband processor 1400 may determine whether an average value of values fed back from the first power amplifier during a predetermined time period exceeds a threshold value. The transmission power control method in the EN-DC state may be applied to the EN-DC state of the same band of FIG. 7B. However, the transmission power control method in the EN-DC state is not limited thereto, and may also be applied in an EN-DC state of the different bands of FIG. 7B. In addition, the transmission power control method may be applied in an NR-DC state in addition to the EN-DC state.

In this regard, the transmission power control method of FIG. 15 may be applied in the EN-DC state of the same band of FIG. 7B, that is, MB/HB LTE+MB/HB NR state. Referring to FIGS. 7A to 15, the baseband processor 1400 may measure at least one of the first and second power values based on an average of values fed back from at least one of the second and fourth power amplifiers PA2 and PA4 during a predetermined time period. In this regard, an LTE signal may be transmitted through the second antenna ANT2 connected to the second power amplifier PA2 and an NR signal may be transmitted through the third antenna ANT3 connected to the fourth power amplifier PA4. Alternatively, the NR signal may be transmitted through the second antenna ANT2 connected to the second power amplifier PA2 and the LTE signal may be transmitted through the third antenna ANT3 connected to the fourth power amplifier PA4.

Accordingly, the baseband processor 1400 may measure at least one of a first power value of the power amplifier PA2 connected to the first transceiver circuit 1200a and a second power value of the power amplifier PA4 connected to the second transceiver circuit 1200b. The baseband processor 1400 may control output power of the second transceiver circuit 1200b and/or the power amplifier PA4 connected to the second transceiver circuit 1200b to limit an NR output power value when the measured LTE power value is equal to or greater than a threshold value.

Since at least one of the first power value and the second power value is measured, a pseudo dynamic power control may be performed to control 5G transmission power according to a total transmission power limit condition. Accordingly, there is an advantage in that time average based power is measured for one communication system and transmission power for the other communication system can be performed quickly and accurately without measuring power for all of the communication systems.

Meanwhile, the baseband processor 1400 can control transmission power even without measurement of the transmission power, by way of determining whether or not the sum of first and second power values requested from the first and second communication systems exceeds a maximum allowable power value. However, in this case, by measuring actual transmission power for at least one communication system, transmission power of another communication system can be dynamically controlled.

Accordingly, the base station can allow the terminal to autonomously determine optimal transmission power within a transmittable power control range. Therefore, the terminal can measure actual transmission power in one communication system, so as to control transmission power of another communication system up to the maximum allowable transmission power range.

The foregoing description has been given of the control method based on the baseband processor in the EN-DC state of the electronic device including antennas according to one aspect disclosed herein. Hereinafter, a description will be given of a method in which a modem controls an RF chain and a transceiver circuit in an EN-DC state of an electronic device having antennas according to another aspect of the present disclosure.

A description will be given of a method in which a modem controls an RF chain and a transceiver circuit in an EN-DC state will be described with reference to FIGS. 1A to 15. Referring to FIGS. 1A to 15, the electronic device may include the first antenna ANT1, the second antenna ANT2, the transceiver circuit 1250, and the modem 1400. In this regard, the transceiver circuit 1250 may include different RF chains 1200a and 1200b. The second antenna ANT2 may be arranged to be spaced apart from the first antenna ANT1 by a predetermined distance, and may be configured to receive the second signal that is then LTE or NR signal of the second band higher than the first band. In this regard, the first antenna ANT1 and the second antenna ANT2 are not limited to receive the signals in the aforementioned bands. The first antenna ANT1 and the second antenna ANT2 may be configured to receive and/or transmit LTE signals or NR signals of various bands.

The transceiver circuit 1250 may be operably coupled to the first antenna ANT1 and the second antenna ANT2, and include an RF chain 1200a for amplifying LTE signals and an RF chain 1200b for amplifying NR signals. The modem 1400 may control the different RF chains 1200a and 1200b within the transceiver circuit 1250 to receive the first signal through the first antenna ANT1 and the second signal through the second antenna ANT2.

The modem 1400 may be configured to perform carrier aggregation (CA) by receiving the first signal through the first antenna ANT1 and the second signal through the second antenna ANT2. The modem 1400 may configure a dual connectivity state with a 4G communication system and a 5G communication system or maintain such dual connectivity state by receiving the first signal through the first antenna ANT1 and the second signal through the second antenna ANT2.

The electronic device may further include the third antenna ANT3 disposed at the predetermined interval from the first antenna ANT1 and configured to receive the third signal that is the LTE or NR signal of the second band. The modem 1400 may perform MIMO by receiving the second signal through the second antenna ANT2 and the third signal through the third antenna ANT3. The modem 1400 may configure the dual connectivity state with the 4G communication system and the 5G communication system or maintain such dual connectivity state by receiving the second signal through the second antenna ANT2 and the third signal through the third antenna ANT3.

The electronic device may further include the fourth antenna ANT4 disposed at the predetermined interval from the third antenna ANT3 and configured to receive the fourth signal that is the LTE or NR signal of the second band.

The modem 1400 may perform MIMO by receiving signals through two or more antennas of the first to fourth antennas ANT1 to ANT4. The modem 1400 may be configured to maintain the dual connectivity state with the 4G communication system and the 5G communication system by receiving signals through two or more antennas of the first to fourth antennas ANT1 to ANT4.

The electronic device may further include the fifth antenna ANT5 disposed at the predetermined interval from the fourth antenna ANT4 and configured to receive the fifth signal that is the LTE or NR signal of the second band.

The modem 1400 may perform MIMO by receiving signals through two or more antennas of the first to fifth antennas ANT1 to ANT5. The modem 1400 may configure the dual connectivity state with the 4G communication system and the 5G communication system or maintain such dual connectivity state by receiving signals through two or more antennas of the first to fifth antennas ANT1 to ANT5.

The foregoing description has been given of the configuration that the electronic device having the plurality of transceivers and antennas according to the embodiment performs the MIMO and/or the CA. In this regard, the electronic device that performs the MIMO and/or the CA may operate in the EN-DC configuration so as to be in the EN-DC state with the eNB and the gNB. Hereinafter, a wireless communication system including an electronic device performing MIMO and/or CA operations and a base station will be described. In this regard, FIG. 16 illustrates a block diagram of a wireless communication system that is applicable to methods proposed herein.

Figure 16:
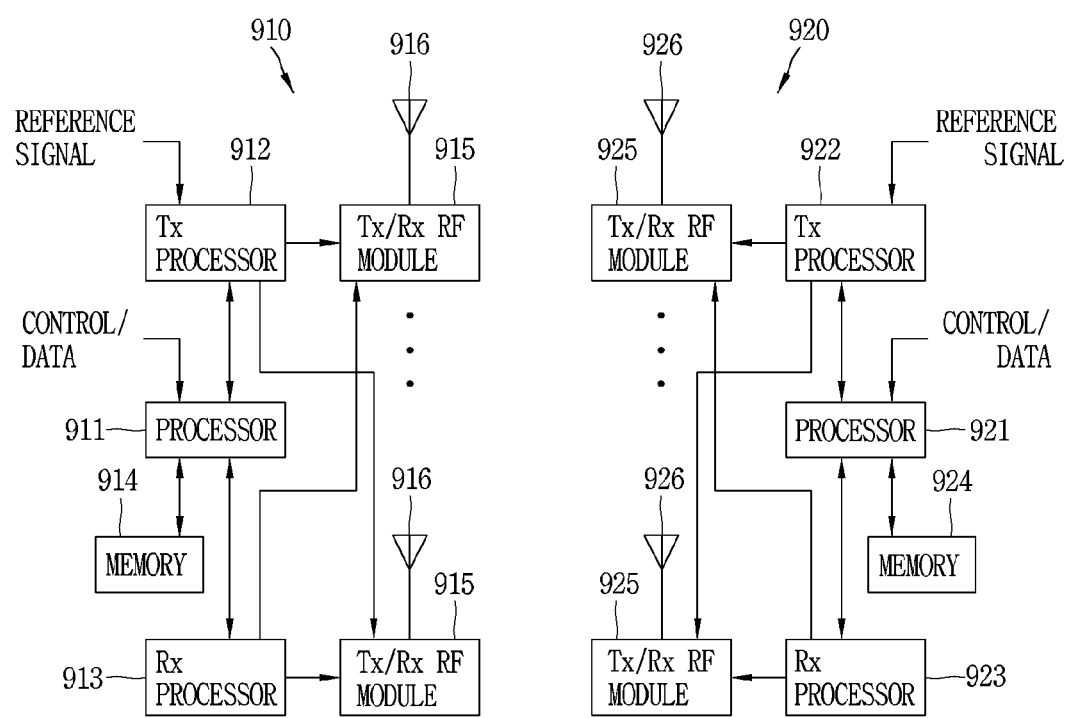
FIG. 16 is an exemplary block diagram of a wireless communication system to which methods proposed herein is applicable.

Referring to FIG. 16, the wireless communication system includes a first communication device 910 and/or a second communication device 920. "A and/or B" may be interpreted to denote the same as "comprising at least one of A and B". The first communication device may represent a base station, and the second communication device may represent a terminal (or the first communication device may represent a terminal, and the second communication device may represent a base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like. In addition, a terminal may be fixed or mobile, and may include a user equipment (UE), a mobile station (MS), a user terminal (UT), a mobile subscriber station (MSS), a subscriber station (SS), and an advanced mobile (AMS), a wireless terminal (WT), a machine-type communication (MTC) device, an machine-to-machine (M2M) device, a device-to-device (D2D) device, a vehicle, a robot, an AI module or the like.

The first communication device and the second communication device include a processor 911, 921, a memory 914, 924, at least one Tx/Rx RF module 915, 925, a Tx processor 912, 922, an Rx processor 913, 923, and an antenna 916, 926. The processor implements the functions, processes and/or methods described above. More specifically, in a DL communication (communication from the first communication device to the second communication device), upper layer packets from a core network (NGC) are provided to the processor 911. The processor implements the function of an L2 layer. In the DL, the processor provides multiplexing, radio resource allocation between a logical channel and a transport channel to the second communication device 920, and is responsible for signaling to the second communication device. A transmit (TX) processor 912 implements various signal processing functions for a L1 layer (i.e., physical layer). The signal processing functions facilitate forward error correction (FEC) in the second communication device, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. An OFDM stream is spatially pre-coded to produce multiple spatial streams. Each spatial stream may be provided to different antennas 916 through individual Tx/Rx modules (or transceivers 915). Each Tx/Rx module may modulate an RF carrier with each spatial stream for transmission. In the second communication device, each Tx/Rx module (or transceiver) 925 receives a signal through each antenna 926 of each Tx/Rx module. Each Tx/Rx module recovers information modulated onto an RF carrier, and provides it to the receive (RX) processor 923. The RX processor implements various signal processing functions of layer 1. The RX processor may perform spatial processing on the information to recover any spatial streams destined for the second communication device. If multiple spatial streams are directed to the second communication device, they may be combined into a single OFDMA symbol stream by multiple RX processors. The RX processor converts the OFDMA symbol stream from a time domain to a frequency domain using fast Fourier transform (FFT). The frequency domain signal includes an individual OFDMA symbol stream for each subcarrier of the OFDM signal. The symbols and reference signal on each subcarrier are recovered and demodulated by determining the most likely signal placement points transmitted by the first communication device. Such soft decisions may be based on channel estimate values. The soft decisions are decoded and deinterleaved to recover data and control signals originally transmitted by the first communication device on the physical channel. The corresponding data and control signals are provided to the processor 921.

The UL (communication from the second communication device to the first communication device) is processed at the first communication device 910 in a similar manner to that described in connection with a receiver function at the second communication device 920. Each Tx/Rx module 925 receives a signal via each antenna 926. Each Tx/Rx module provides an RF carrier and information to the RX processor 923. The processor 921 may be associated with the memory 924 that stores program codes and data. The memory may be referred to as a computer readable medium.

Meanwhile, technical effects of an electronic device having a plurality of antennas operating in different communication systems according to the present disclosure will be described as follows.

According to the present disclosure, an electronic device having a plurality of antennas operating in different communication systems such as 4G LTE and 5G NR can be provided.

According to the present disclosure, a structure for sharing 4G/5G receiving antennas of adjacent bands within an electronic device can be provided.

According to the present disclosure, even when 5G communication is supported, 4G LTE antennas can be shared, which may result in improving the freedom of antenna design in a 5G sub-6 band.

According to the present disclosure, a layout of a plurality of antennas of different communication systems can be designed without changing a form factor of an electronic device, which may result in enabling a dual connectivity operation.

According to the present disclosure, dual connectivity and multi-connectivity with communication systems such as LTE/sub-6/mmWave can be configured and maintained using a plurality of antennas provided in an electronic device.

According to the present disclosure, carrier aggregation and/or MIMO operations can be performed in an EN-DC state using different antennas in an electronic device.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

With regard to the present disclosure described above, the design of an antenna including processors 180, 1250, and 1400 and a controller for controlling the same in an electronic device 180 having a plurality of antennas, and a control method thereof may be implemented as codes readable by a computer on a medium written by a program. The computer-readable media includes all types of recording devices in which data readable by a computer system can be stored. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An electronic device having antennas, the electronic device comprising:
    a first antenna disposed on a rim thereof and configured to receive a first signal that is a Long-Term Evolution (LTE) signal or a New Radio (NR) signal of a first band;
    a second antenna disposed to be spaced apart from the first antenna by a predetermined interval, and configured to receive a second signal that is an LTE or NR signal of a second band;
    a third antenna arranged to be spaced apart from the first antenna by a predetermined interval, and configured to receive a third signal that is the LTE signal or the NR signal of the second band;
    a transceiver circuit operably coupled to the first antenna, the second antenna, and the third antenna; and
    a baseband processor configured to control the transceiver circuit to receive the first signal through the first antenna and the second signal through the second antenna or third antenna,
    wherein the first antenna transmits or receives an LTE signal and the third antenna configured to transmits or receives a NR signal in a first state of E-UTRA-NR Dual Connectivity (EN-DC),
    wherein the first antenna transmits or receives a NR signal and the second antenna transmits or receives an LTE signal in a second state of EN-DC, and
    wherein the second antenna transmits or receives an LTE signal and the third antenna transmits or receives a NR signal in a third state of EN-DC.

2. The electronic device of claim 1, wherein he first antenna transmits or receives the LTE signal in the first band and the third antenna configured to transmits or receives the NR signal in the second band in the first state of EN-DC,
    wherein the first antenna transmits or receives the NR signal in the first band and the second antenna transmits or receives the LTE signal in the second band in a second state of EN-DC, and
    wherein the second antenna transmits or receives an LTE signal in the second band and the third antenna transmits or receives a NR signal in the second band in a third state of EN-DC.

3. The electronic device of claim 1, wherein the baseband processor performs carrier aggregation (CA) or maintains at least one of the first to the third state of the EN-DC with a Fourth-Generation (4G) communication system and a Fifth-Generation (5G) communication system by receiving the first signal through the first antenna and the second signal through the second antenna.

4. The electronic device of claim 1, wherein the baseband processor performs Multi input/multi output (MIMO) or maintains at least one of the first to the third state of the EN-DC state with a 4G communication system and a 5G communication system by receiving the second signal through the second antenna and the third signal through the third antenna.

5. The electronic device of claim 4, further comprising a fourth antenna arranged to be spaced apart from the third antenna by a predetermined interval, and configured to receive a fourth signal that is the LTE signal or the NR signal of the second band,
    wherein the baseband processor performs the MIMO or maintains at least one of the first to the third state of the EN-DC with the 4G communication system and the 5G communication system by receiving signals through at least two antennas of the first to fourth antennas.

6. The electronic device of claim 5, further comprising a fifth antenna arranged to be spaced apart from the fourth antenna by a predetermined interval, and configured to receive a fifth signal that is the LTE signal or the NR signal of the second band,
    wherein the baseband processor performs the MIMO or maintains at least one of the first to the third state of the EN-DC with the 4G communication system and the 5G communication system by receiving signals through at least two antennas of the first to fifth antennas.

7. The electronic device of claim 6, wherein the first antenna is configured as a metal rim on a lower region of the electronic device and one side region connected to the lower region, and wherein the second antenna is configured as a metal rim on the lower region and another side region connected to the lower region.

8. The electronic device of claim 7, wherein the third antenna is configured as a metal rim on the one side region to be spaced apart from the first antenna by the predetermined interval due to a dielectric member, wherein the fourth antenna is configured as a metal rim on an upper region of the electronic device and one side region connected to the upper region, and wherein the fifth antenna is configured as a metal rim on the upper region and another side region connected to the upper region.

9. The electronic device of claim 6, wherein the baseband processor performs Carrier Aggregation (CA) over the first band, the second band, and a third band by receiving a signal through at least one of the first to fifth antennas.

10. The electronic device of claim 1, wherein the third antenna is configured to receive the third signal and is operably coupled to a diversity Radio Frequency (RF) module to amplify the third signal from the third antenna.

11. An electronic device having antennas, the electronic device comprising:
a first antenna disposed on a rim thereof and configured to receive a first signal that is a Long-Term Evolution (LTE) signal or a New Radio (NR) signal of a first band;
a second antenna configured to receive a second signal that is an LTE or NR signal of a second band;
a third antenna configured to receive a third signal that is the LTE signal or the NR signal of the second band;
a first Radio Frequency (RF) module operably coupled to the first antenna and second antenna, and configured to amplify a signal of the first band;
a second RF module operably coupled to the first antenna, and configured to amplify signals of the second band and a third band higher than the second band,
a third RF module operably coupled to the third antenna, and configured to amplify signals of the second band and the third band and to receive or transmit the amplified signals; and
a transceiver circuit operably coupled to the first antenna, the second antenna, and the third antenna,
wherein at least one of the first RF module and the second RF module is further configured to transmit or receive the LTE signal and the NR signal in a state of EN-DC.

12. The electronic device of claim 11, further comprising a diversity RF module operably coupled to the third antenna and configured to amplify the third signal from the third antenna.

13. The electronic device of claim 11, further comprising:
a fourth antenna configured to receive a fourth signal that is the LTE signal or the NR signal of the first band or the second band higher than the first band;
a fifth antenna arranged to be spaced apart from the fourth antenna, and configured to receive a fifth signal that is the LTE signal or the NR signal of the first band or the second band.

14. The electronic device of claim 13, wherein the fourth antenna is further configured to:
receive the signals of the first to third bands;
transfer the signal of the first band to the first RF module, and the signals of the second and third bands to the second RF module, and
wherein the fifth antenna is further configured to:
receive the signals of the second band and the third band; and
transmit the received signals of the second band and the third band to the third RF module.

15. The electronic device of claim 11, further comprising a transmission switch operably coupled to the transceiver circuit, and configured to switch a path of the LTE or NR signal of the first band,
wherein the baseband processor controls a connectivity state of the transmission switch to be changed in a subframe before the NR signal is transmitted after the LTE signal is transmitted.

16. The electronic device of claim 11, wherein the second antenna is further configured to receive and transmit the second signal of the second band and a signal of a third band higher than the second band, and
wherein the third antenna is further configured to receive and transmit the second signal of the second band and the signal of the third band.

17. The electronic device of claim 11, further comprising a baseband processor that controls the second RF module and the third RF module to perform MIMO through the fourth antenna and the fifth antenna while performing CA of the second band and the third band.

18. An electronic device having antennas, the electronic device comprising:
a first antenna configured to receive a first signal that is a Long-Term Evolution (LTE) signal or a New Radio (NR) signal of a first band;
a second antenna configured to receive a second signal that is an LTE or NR signal of a second band;
a third antenna configured to receive a third signal that is the LTE signal or the NR signal of the second band;
a first Radio Frequency (RF) chain operably coupled to the first antenna for amplifying the LTE signal and the NR signal of the first band;
a second RF chain operably coupled to the second antenna and the third antenna for amplifying the LTE signal and the NR signal of the second band;
a transceiver circuit operably coupled to the first RF chain, the second RF chain, and configured to amplify signals of the first band and signals of the second band; and:
a modem configured to control the first and second RF chains through the transceiver circuit to receive the first signal through the first antenna and the second signal through the second antenna,
wherein at least one of the first RF chain and the second RF chain is further configured to transmit or receive the LTE signal and the NR signal in a state of EN-DC.

19. The electronic device of claim 18, further comprising a diversity RF module operably coupled to the third antenna and configured to amplify the third signal from the third antenna.

20. The electronic device of claim 19, further comprising a fifth antenna arranged to be spaced apart from the fourth antenna, and configured to receive a fifth signal that is the LTE signal or the NR signal of the second band,
wherein the modem performs the MIMO or maintains the state of EN-DC with the 4G communication system and the 5G communication system by receiving signals through at least two antennas of the first to fifth antennas.

21. The electronic device of claim 18, wherein the modem performs Carrier Aggregation (CA) or maintains the state of EN-DC with a Fourth-Generation (4G) communication system and a Fifth-Generation (5G) communication system by receiving the first signal through the first antenna and the second signal through the second antenna.

22. The electronic device of claim 18,
wherein the modem performs Multi input/multi output (MIMO) or maintains the state of EN-DC with a 4G communication system and a 5G communication system by receiving the second signal through the second antenna and the third signal through the third antenna.

23. The electronic device of claim 18, further comprising a fourth antenna arranged to be spaced apart from the third antenna, and configured to receive a fourth signal that is the LTE signal or the NR signal of the second band higher than the first band,
wherein the modem performs the MIMO or maintains the state of EN-DC with the 4G communication system and the 5G communication system by receiving signals through at least two antennas of the first to fourth antennas.

\* \* \* \* \*